(12) United States Patent
Sakamoto et al.

(10) Patent No.: US 7,768,669 B2
(45) Date of Patent: Aug. 3, 2010

(54) IMAGE PROCESSING APPARATUS, PRINTER USING THIS APPARATUS, DIGITAL CAMERA USING THIS APPARATUS, CONSUMABLE MATERIAL HOLDER FOR PRINTER, AND PRINTER FOR DIGITAL CAMERA

(75) Inventors: Shigeru Sakamoto, Chiba (JP); Shinya Goto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1908 days.

(21) Appl. No.: 09/946,490

(22) Filed: Sep. 6, 2001

(65) Prior Publication Data

US 2002/0033958 A1 Mar. 21, 2002

(30) Foreign Application Priority Data

Sep. 12, 2000 (JP) ............................. 2000-276575
Sep. 12, 2000 (JP) ............................. 2000-276576

(51) Int. Cl.
 *G06K 15/00* (2006.01)
(52) U.S. Cl. ..................... 358/1.16; 347/5; 347/19; 347/23; 347/43; 358/1.12; 358/1.13
(58) Field of Classification Search ............... 358/1.13, 358/1.18, 502, 448, 1.14, 449, 1.12, 429, 358/1.16; 347/5, 19, 23, 43
See application file for complete search history.

(56) References Cited

U.S. PATENT DOCUMENTS 5,480,132 A * 1/1996 Kiyohara et al. ......... 271/10.01
5,642,145 A * 6/1997 Tanaka et al. ............... 347/111
5,745,145 A   4/1998 Hirabayashi et al. ........ 347/183
5,949,445 A * 9/1999 Aichi ............................ 347/5
6,000,782 A * 12/1999 Lee ............................. 347/43

(Continued)

FOREIGN PATENT DOCUMENTS

EP       0 592 198       4/1994

(Continued)

OTHER PUBLICATIONS

Apr. 18, 2006 Japanese Official Action in Japanese Patent Application No. 2000-276576 (with English-language translation).

(Continued)

*Primary Examiner*—David K Moore
*Assistant Examiner*—Benjamin O Dulaney
(74) *Attorney, Agent, or Firm*—Fitzpatrick, Cella, Harper & Scinto

(57) ABSTRACT

In a printer to which a printer consumable material holder for supplying a printing medium is detachably mounted or in a digital camera which integrally includes this printer, image processes suitable for various printing media capable of being supplied can be performed. To do so, an information memory unit for storing information of the printing media is provided in the printer consumable material holder. In association with this, a unit for receiving the information, and a unit for analyzing the received information and determining an optimum image processing method for performing printing on the printing medium are provided in the printer. In a system structured by combining these units, the optimum image process is automatically adopted on the basis of the information stored in the printer consumable material holder.

10 Claims, 20 Drawing Sheets

U.S. PATENT DOCUMENTS

| | | | |
|---|---|---|---|
| 6,115,137 A | 9/2000 | Ozawa et al. | 358/1.6 |
| 6,283,653 B1 | 9/2001 | Higuchi | 400/582 |
| 6,293,717 B1* | 9/2001 | Kurashina | 400/615.2 |
| 6,445,461 B1 | 9/2002 | Ozawa et al. | 358/1.6 |
| 6,603,567 B1 | 8/2003 | Itoh et al. | 358/1.14 |
| 6,682,236 B2 | 1/2004 | Higuchi | 400/582 |
| 6,687,022 B1* | 2/2004 | Lapstun et al. | 358/1.9 |
| 6,819,442 B2* | 11/2004 | Takahashi | 358/1.15 |
| 6,856,425 B2 | 2/2005 | Ozawa et al. | 358/1.6 |
| 7,031,021 B1* | 4/2006 | Lain et al. | 358/1.9 |
| 7,110,147 B1* | 9/2006 | Hayama et al. | 358/464 |
| 2001/0043830 A1 | 11/2001 | Higuchi | 400/582 |
| 2002/0075502 A1* | 6/2002 | Hayama | 358/1.15 |
| 2003/0016378 A1 | 1/2003 | Ozawa et al. | 358/1.13 |
| 2003/0140694 A1* | 7/2003 | Usui et al. | 73/290 V |

FOREIGN PATENT DOCUMENTS

| | | | |
|---|---|---|---|
| EP | 0 813 335 A2 | 12/1997 | |
| EP | 1 004 446 A2 | 5/2000 | |
| EP | 1 014 708 | 6/2000 | |
| JP | 05-064045 | 3/1993 | |
| JP | 10-19125 | 1/1998 | |
| JP | 10-108005 | 4/1998 | |
| JP | 10-173833 | 6/1998 | |
| JP | 10-257427 | 9/1998 | |
| JP | 10-304187 | 11/1998 | |
| JP | 11-18033 | 1/1999 | |
| JP | 11-217131 | 8/1999 | |
| JP | 11-328382 | 11/1999 | |
| JP | 2000-001225 | 1/2000 | |
| JP | 2000-103097 | 4/2000 | |
| WO | 97/50243 | 12/1997 | |
| WO | WO 98/52762 | 11/1998 | |
| WO | WO 99/02348 | 1/1999 | |

OTHER PUBLICATIONS

European Search Report dated Dec. 8, 2003 (Ref. No. 2783930/IM).

* cited by examiner

IMAGE PROCESSING APPARATUS, PRINTER USING THIS APPARATUS, DIGITAL CAMERA USING THIS APPARATUS, CONSUMABLE MATERIAL HOLDER FOR PRINTER, AND PRINTER FOR DIGITAL CAMERA

BACKGROUND OF THE INVENTION

1. Field of the Invention

The present invention relates to an image processing apparatus, a printer, a consumable material holder for the printer (hereafter called a printer consumable material holder or a media pack), and a digital camera having the printer.

2. Related Background Art

Recently, digital cameras have become widespread, and the demand to print and output an image taken by the digital camera on the spot has thus risen. To meet such the demand, there has been developed a digital camera-cum-printer (or a digital camera with a built-in printer) which has a means for storing image information taken by the camera and a printer for visibly printing the stored image information.

As a configuration to supply printing media (i.e., sheets) to the printer for the digital camera, there are the configuration that a sheet cassette filled with sheets supplied from an independent sheet package is mounted to the printer, or the configuration that a sheet packet precomposed as a cassette is directly inserted into the main body of the printer.

However, it is supposed that kinds of printing media supplied by the sheet cassette or the sheet package (the printer consumable material holder or the media pack) are miscellaneous. On the other hand, if an image process is not performed in accordance with the kind of medium, high-quality printing can not be performed for the taken image and the like. Namely, even if an image processing system has been structured on the printer side in correspondence with a kind of printing medium, it is supposed that such an image processing system can not cope with other kinds of printing media, whereby a user's selectable width for the printer is resultingly narrowed.

Further, even in a case where the image processing system is structured to be able to cope with different kinds of printing media, if the kind of printing medium supplied on the printer side can not be appropriately discriminated, the user must perform a complicated operation to judge which kind of printing medium to use and notify the printer side of such a judged result through some interface. Then, if the user erroneously judges the printing medium to be used, an image process inappropriate for the judged and selected printing medium is performed and the inappropriately processed printing medium is then subjected to printing, whereby the printing media are uselessly consumed.

Further, the conventional digital camera stores therein taken images of several image sizes inherently determined to each camera. For example, taken images of 2048×1536 pixels, 1024×768 pixels, 640×480 pixels, and the like are stored. The taken image stored has an information size (including aspect ratio (i.e., ratio of longitudinal size and lateral size)) substantially the same as that of an image displayed on one or both a viewfinder and an LCD (liquid crystal display) monitor. However, there is a kind of digital camera which changes the aspect ratio of a taken image according to the image size thereof and stores the image of the changed aspect ratio. For example, a taken image whose aspect ratio has been changed according to the image size of 1800×1200 pixels, 1280×1024 pixels, 640×480 pixels, or the like is stored in this digital camera. Further, there is a kind of recent digital camera which stores a taken image of an aspect ratio (3:2), which is the same as that of a silver bromide photograph, in response to user's designation.

On the other hand, ordinarily, an image taken by the digital camera is captured by a host apparatus such as a personal computer or the like. Then, the captured image is subjected to enlargement/reduction and trimming to be conformed with a user-designated printing sheet size and a printer-inherent printable area, in accordance with printing applications. Particularly, if it is intended to print the taken image entirely on the printable area of a designated printing sheet, the printing is often performed in a state that either the information at the top and bottom of the image or the information at the right and left of the image has been deleted.

Japanese Patent Application Laid-Open No. 10-108005 proposes a means which causes, in a printing system which directly connects a digital camera and a printer without any independent personal computer, the digital camera to display a layout image in case of printing a photographed image.

Further, Japanese Patent Application Laid-Open No. 10-19125 proposes a mode in a printing system which directly connects a digital camera and a printer without any independent personal computer. In this mode, a printing mask pattern has been previously provided, and this mask pattern and image data from which the area masked by this mask pattern has been eliminated are synthesized and displayed.

Further, Japanese Patent Application Laid-Open No. 10-257427 proposes control in a digital camera having a seal printing function. Namely, under this control, image data of a taken subject and image data of the background or foreground of this subject are synthesized, and the synthesized image data is displayed.

Further, Japanese Patent Application Laid-Open No. 11-18033 proposes a display control means which displays, on a display means, printing image data received from a printer by a communication means.

Further, Japanese Patent Application Laid-Open No. 2000-103097 proposes a storage means which is provided in a printer using thermosensitive recording sheets. This storage means stores plural different-sized image data respectively corresponding to the plural kinds of thermosensitive recording sheets.

However, conventionally, although the aspect ratio of display image information taken by the digital camera and displayed on the viewfinder or the LCD monitor is substantially the same as that of image information stored on a storage medium such as a compact flash card or the like, the size of such the image information is not necessarily the same as that of printing image information. Since the many kinds of digital cameras store the image information in the aspect ratio of 4:3, if it is supposed that printing is performed with fullbleed on an A4 sheet whose aspect ratio is substantially 10:7, a part of the taken image is not always printed. When a series of user's operations of taking the image by the digital camera and then printing the taken image is supposed, a part of the image information at the time of photographing is deleted and printed irrespective of user's intention. The reason why such a printing operation unsuitable for the user's intention is performed is that printing information including information of a printing medium is difficult to be added to an image when this image was taken by the digital camera.

Further, there is a digital camera which assumes printing on a sheet with the same size as a silver bromide printing paper sheet and thus has a mode to store image data in the aspect ratio of 3:2 according to user's designation. However, such an aspect ratio is different from that of a display such as a viewfinder, and an LCD monitor and the like, and the range of the taken image is not indicated on the display, whereby it is very difficult for the user to judge a photographing range.

As described above, when the printed result is different from the user's intention, since it is necessary for the user to retake or rephotograph the once taken image, a load is imposed on the user. Further, if one image was taken in a remote place such as a travel destination or the like, it is very difficult for the user to retake the same image.

SUMMARY OF THE INVENTION

An object of the present invention is to solve all or at least one of such conventional problems as above.

Another object of the present invention is to perform an image process optimum for printing media and print a thus processed image, in an image processing apparatus which is used for a printer to which a printer consumable material holder for supplying the printing media is detachably mounted.

In order to achieve the object, in the image processing apparatus which is used for the printer to which the printer consumable material holder for supplying the printing media is detachably mounted, a means for obtaining information provided by the holder and used to perform the image process suitable for the held printing media, a means for determining the image process suitable for the printing media on the basis of the obtained information, and a means for performing the determined image process on image data are disclosed.

Still another object of the present invention is to appropriately perform not only printing, but also an image process at a photographing time in accordance with a kind of printer consumable material holder.

In order to achieve the object, there is provided an image processing apparatus which is used in a printer to which a printer consumable material holder for supplying a printing medium is detachably mounted, comprising:

a means for obtaining information provided by the holder and used to perform an image process suitable for the held printing medium;

a means for determining the image process suitable for the printing medium, on the basis of the information obtained by the obtaining means; and a means for performing the image process determined by the determining means, on image data.

Still another object of the present invention is to provide an image processing apparatus, a printer and a digital camera which are excellent in operability and visibleness, in accordance with a kind of printer consumable material holder.

Still another object of the present invention is to be able to obtain printing medium information, and to be able to indicate an actual printing range for a taken image displayed on a monitor such as a viewfinder, an LCD or the like, on the basis of the obtained printing medium information and designation information (for fullbleed printing designation, printing-cum-margin designation, etc.) designated by a user.

In order to achieve these objects, the image processing apparatus, the printer and the digital camera are provided, each of which includes an information obtaining means for obtaining information of a printing medium on which an image is printed, an area judgment means for judging a printable area on the printing medium on the basis of the obtained information, and a display processing means for displaying the judged printable area on a display.

Still another object of the present invention is to provide an image processing apparatus and a digital camera which are excellent in operability and visibleness at a photographing time, in accordance with a kind of printer consumable material holder.

In order to achieve the object, there is provided a digital camera which includes display means for displaying an image, comprising:

an information obtaining means for obtaining information of a printing medium on which the image is printed;

an area decision means for deciding a printable area on the printing medium on the basis of the information obtained by the information obtaining means; and a display processing means for causing the display means to display the printable area decided by the area decision means.

Still another object of the present invention is to provide a printer consumable material holder (or a media pack) which is used in an image processing apparatus, a printer, a digital camera and the like to achieve the above objects.

In order to achieve the object, there is provided a printer consumable material holder which holds a printing medium to be supplied to a printer, and a coloring agent to be used in printing, comprising:

a means for storing information used to perform an image process suitable for the held printing medium and the held coloring agent; and a means for providing the information from the information storing means.

Further, in order to achieve the object, there is provided a display processing method for a digital camera which includes display means for displaying an image, comprising:

an information obtaining step of obtaining information of a printing medium on which the image is printed;

an area decision step of deciding a printable area on the printing medium on the basis of the information obtained in the information obtaining step; and a display processing step of causing the display means to display the printable area decided in the area decision step.

Other objects and features of the present invention will become apparent from the following description and the attached drawings.

DETAILED DESCRIPTION OF THE PREFERRED EMBODIMENTS

First Embodiment

Figure 1:
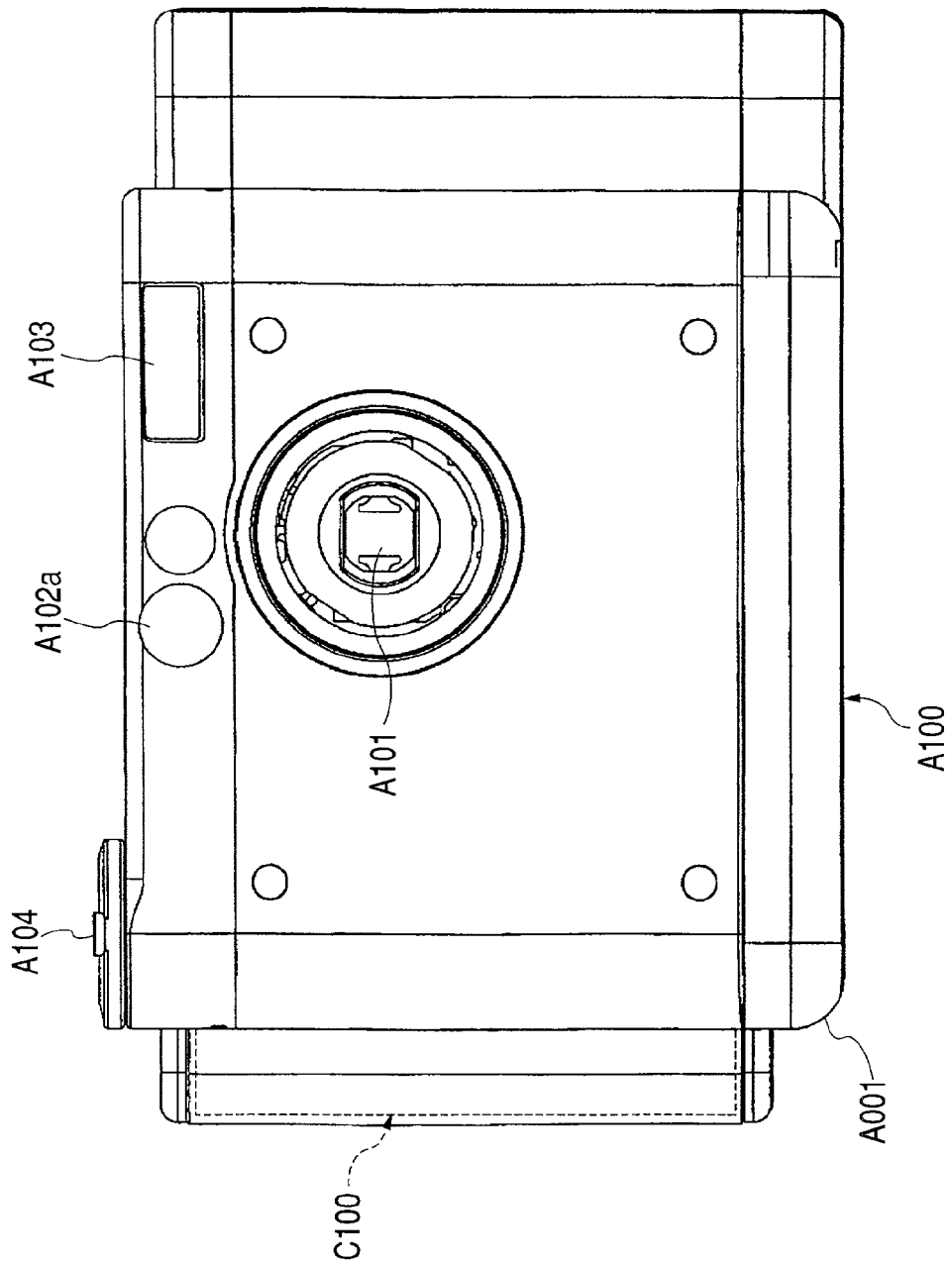
FIG. 1 is an elevation view of a camera with a built-in printer (or a camera-cum-printer) to which the present invention is applicable.

Hereinafter, the first embodiment of the present invention will be explained in detail with reference to the attached drawings.

In the present application, it should be noted that the term "printing" (it might be called "recording" in the explanation of the embodiments) includes, in addition to a case of forming significant information such as a character, a figure and the like, a case of widely forming an image, a figure, a pattern and the like on a printing medium, regardless of whether such image forming is significant or insignificant and whether or not they have been actualized to be perceivable by humans, and a case of processing or editing the printing medium.

Further, it should be noted that the term "printing medium" includes, in addition to a sheet or paper used in a general printing apparatus, various things capable of receiving or accepting ink, such as cloth, a plastic film, a metallic board or the like, a glass, ceramics, a wood, leather, and the like. In any case, it is assumed in the present application that these things are also included in "sheet" or "paper" generally.

Further, in the present application, it should be noted that the term "camera" includes an apparatus, equipment and a device which optically pick up images and then convert the picked-up optical images into electrical signals. In the following, the camera is also called "image pickup unit".

Further, in the present application, the term "ink" (it might be called "liquid") should be widely interpreted, as well as the definition of the above term "printing". Namely, it should be noted that "ink" includes liquid which is used, by application onto a printing medium, to form an image, a figure, a pattern and the like, process the printing medium, or process the ink itself (i.e., to coagulate or insolubilize coloring agents in the ink applied to the printing medium).

Further, it should be noted that, as a form of a head effectively used in the present invention, a recording head which causes film boiling in the liquid by using thermal energy from an electrothermal converter and thus generates bubbles is adopted.

(Basic Structure)

First, the basic structure of the apparatus according to the present invention will be explained with reference to FIGS. 1 to 14. The apparatus explained in the present embodiment is structured as information processing hardware which has an image pickup unit (also called a camera unit hereinafter) for optically taking (or picking up) an image and then converting the taken image into an electrical signal, and an image recording unit (also called a printer unit hereinafter) for recording the image based on the obtained electrical signal. Hereinafter, the information processing hardware explained in the present invention is called a camera with a built-in printer.

In the body of the apparatus (called an apparatus body A001 hereinafter), a printer unit (i.e., a recording unit) B100 is integrally incorporated on the back side of a camera unit A100. The printer unit B100 records an image by using ink and a printing medium supplied from a media pack C100. In the present embodiment, as apparent from the apparatus body A001 of FIG. 5 from which the cover has been removed and which is viewed from the back side, the media pack C100 is inserted into the apparatus body A001 from the right, while the printer unit B100 is disposed on the left thereof. In case of performing the recording by the printer unit B100, the apparatus body A001 may be set such that a liquid crystal display unit A105 (later described) of the camera unit A100 is on the upside and a lens A101 (later described) thereof is on the downside. In such a recording attitude, a recording head B120 (later described) of the printer unit B100 is set to emit the ink downward. The recording attitude is not limited to the above, i.e., this attitude can be set to be the same as a taking (or photographing) attitude of the camera unit A100. In any case, from the viewpoint of stability of a recording operation, the recording attitude by which the ink is emitted downward is preferable.

In the following, the basic structure of the apparatus according to the present embodiment will be explained separately for a part A (camera unit), a part B (media pack) and a part C (printer unit). Further, a basic structure of a signal processing system will be explained as a part D (signal processing system).

A (Camera Unit)

Figure 2:
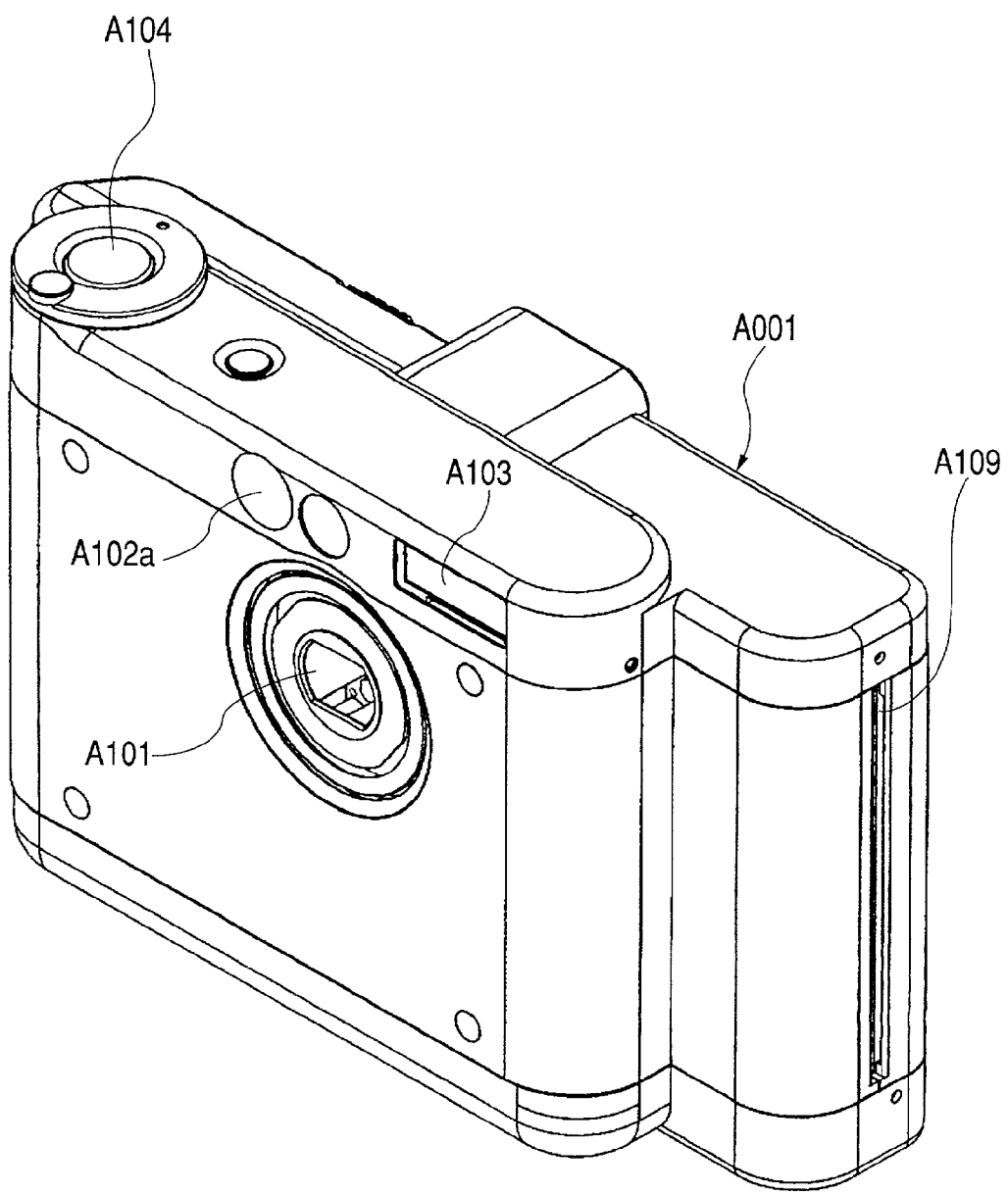
FIG. 2 is a perspective diagram in which the camera of FIG. 1 is viewed from the diagonal front.
Figure 3:
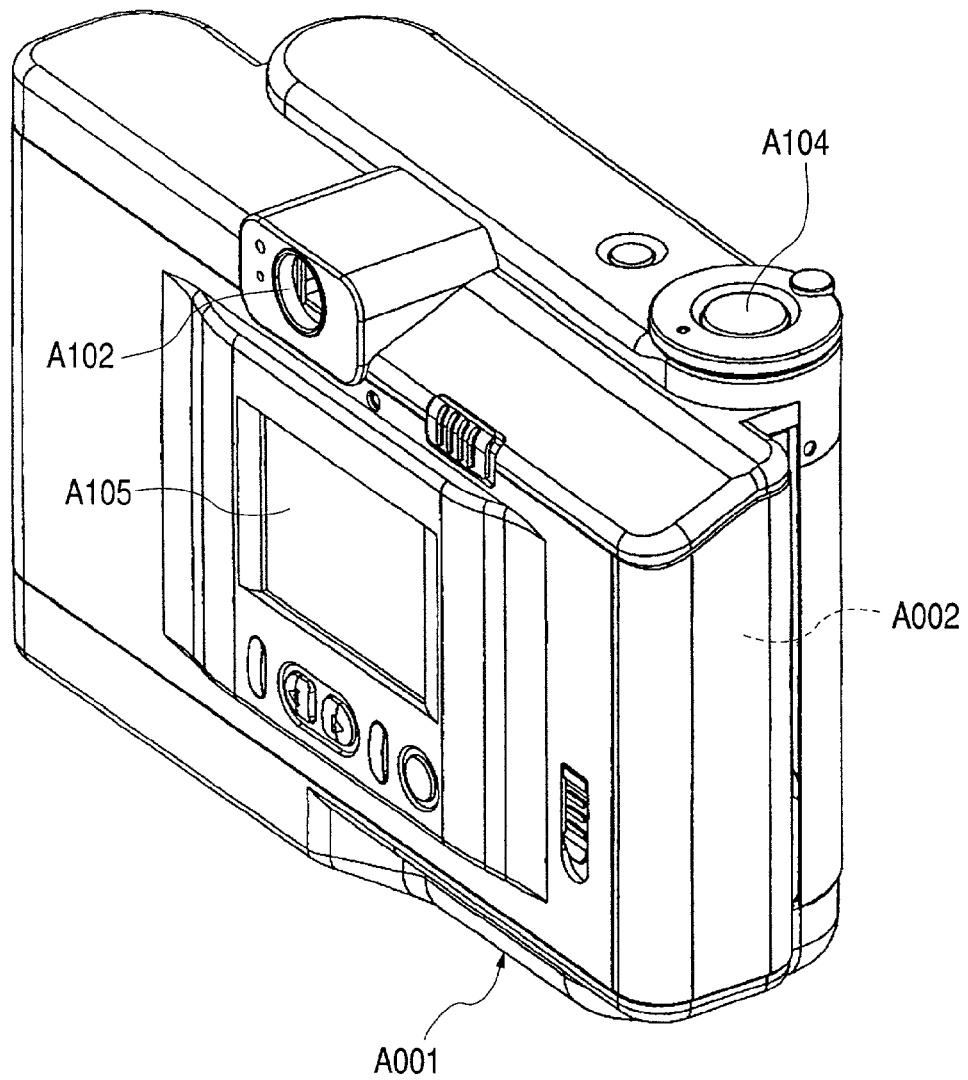
FIG. 3 is a perspective diagram in which the camera of FIG. 1 is viewed from the diagonal back.

The camera unit A100 basically constitutes a general digital camera. Thus, the camera unit A100 is integrally incorporated into the apparatus body A001 together with the printer unit B100, whereby the digital camera with a built-in printer as shown in FIGS. 1 to 3 is structured. In FIGS. 1 to 3, symbol A101 denotes the lens, symbol A102 denotes a finder, symbol A102a denotes a finder window, symbol A103 denotes a stroboscopic lamp, symbol A104 denotes a release button, and symbol A105 denotes the liquid crystal display unit (an external display unit). As described later, the camera unit A100 processes image data obtained by a CCD (charge-coupled device), stores the obtained image data in a CF (compact flash memory) card A107, displays the stored image, and exchanges various data with the printer unit B100. Symbol A109 denotes a discharge unit to which a printing medium (or a printing sheet) C104 on which the taken image has been recorded is discharged. Symbol A108 shown in FIG. 5 denotes a battery which acts as a power supply for the camera unit A100 and the printer unit B100.

B (Media Pack)

Figure 4:
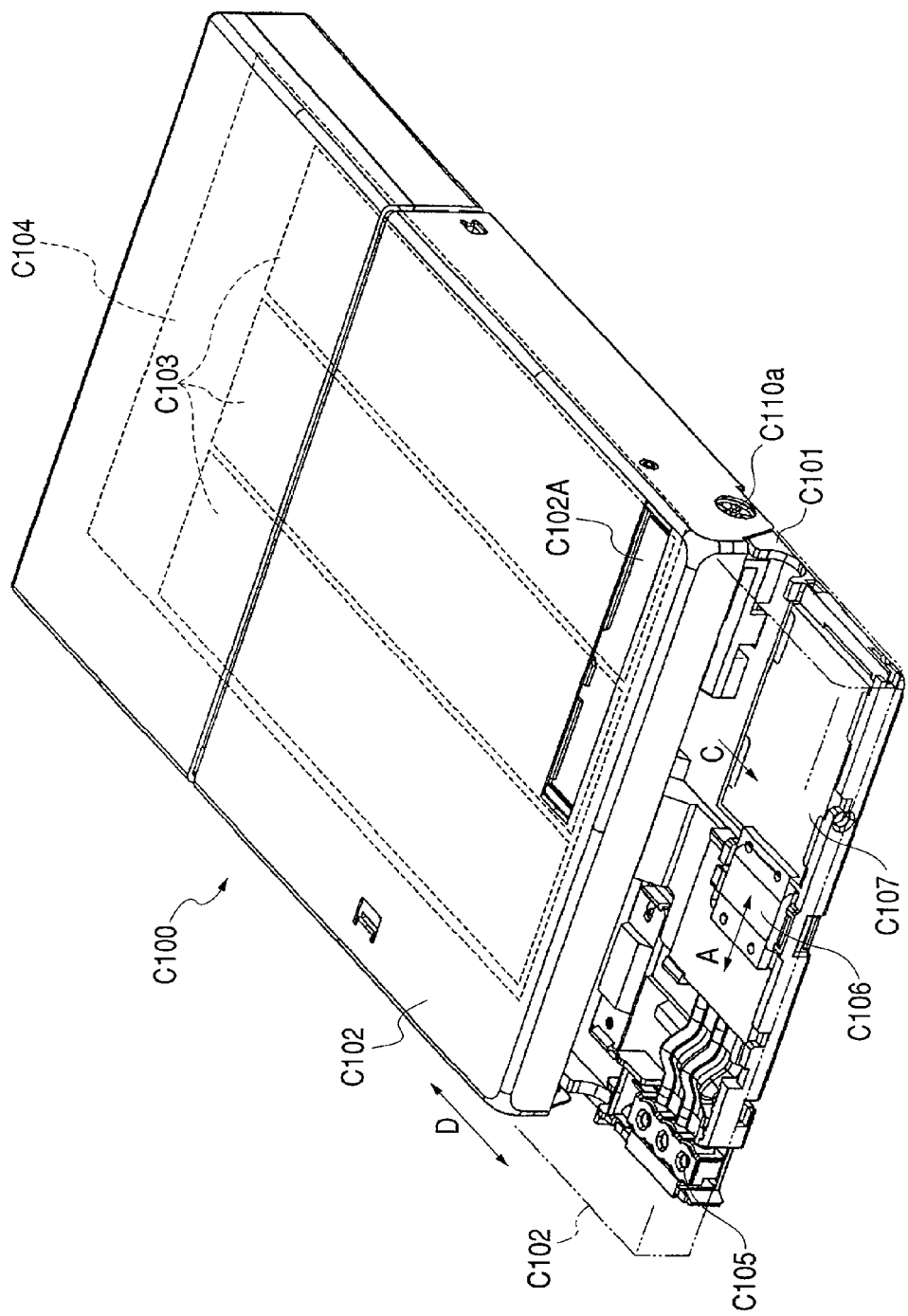
FIG. 4 is a perspective diagram of a media pack which is detachably mounted to the camera of FIG. 1.
Figure 5:
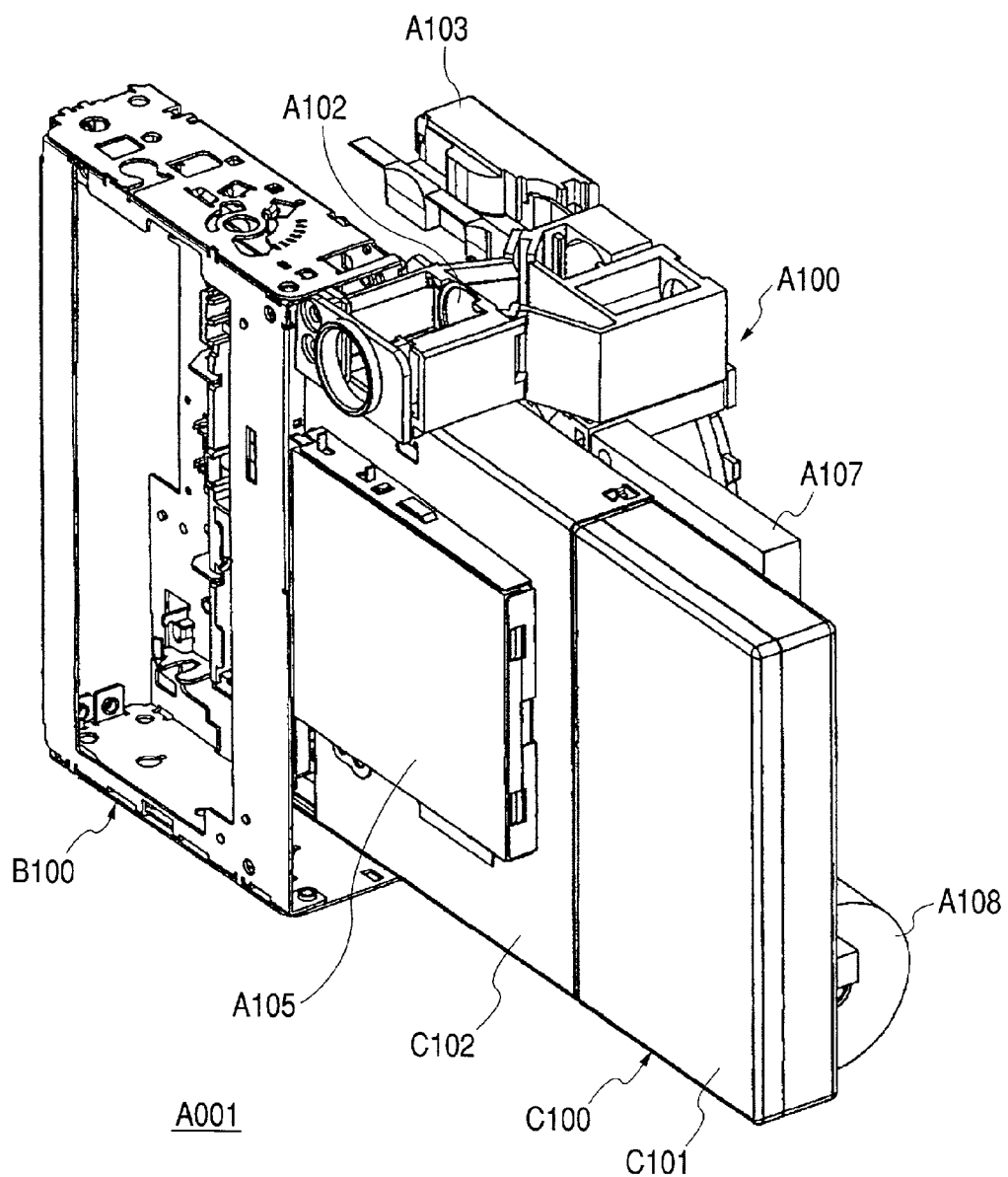
FIG. 5 is a perspective diagram showing arrangements of main parts within the camera of FIG. 1.

The media pack C100 is detachably mounted to the apparatus body A001. In the present embodiment, the media pack C100 is inserted through an insertion unit A002 (see FIG. 3) and thus mounted to the apparatus body A001 as shown in FIG. 1. The insertion unit A002 is closed as shown in FIG. 3 while the media pack C100 is not being mounted, but is opened when the media pack C100 is mounted. FIG. 5 shows the state that the cover has been removed from the apparatus body A001 to which the media pack C100 has been mounted. As shown in FIG. 4, a shutter C102 is slidably provided along a direction D on the body of the media pack C100 (called a pack body C101 hereinafter). When the media pack C100 is not mounted to the apparatus body A001, the shutter C102 is slid and set at the position indicated by the alternate long and two short dashed line in FIG. 4. Then, when the media pack C100 is mounted to the apparatus body A001, the shutter C102 is slid and set at the position indicated by the solid line in FIG. 4.

Ink packs C103 and the printing media C104 are held in the back body C101. In FIG. 4, the ink packs C103 are held below the printing media C104. In the present embodiment, there are the three ink packs C103 for containing Y (yellow), M (magenta) and C (cyan) inks independently, and the printing media C104 include about 20 stacked printing sheets. In any case, an optimum combination of the ink packs and the printing media is appropriately selected for the image recording, and they are held in the identical media pack C100. Therefore, various kinds of media packs C100 (e.g., a media pack for super high image quality, a media pack for normal image quality, a media pack for seals (division seals), and the like) each of which has a different combination of the ink packs and the printing media are provided, and each of the media packs C100 is selectively mounted to the apparatus body A001 in accordance with the kind of image to be recorded, usage of the printing medium on which an image has been formed, and the like. Thus, the image according to a certain object can be surely recorded by using the optimum combination of the ink packs and the printing media. Further, a later-described EEPROM (electrically erasable programmable read-only memory) acting as a discrimination IC (integrated circuit) is provided in the media pack C100, and thus discrimination data representing kinds of inks, the kind of printing medium, the remainder of the inks, the remainder of the printing medium and the like in the media pack C100 is stored in the EEPROM.

When the media pack C100 is mounted to the apparatus body A001, the ink packs C103 are respectively connected to the later-described ink supply system on the apparatus body A001 through three joints C105 respectively corresponding to the Y, M and C inks. On the other hand, the printing medium C104 is separated one by one from its sheaf by an unillustrated separation mechanism, and then transported along a direction C by a later-described sheet feed roller C110 (see FIG. 9). In this case, power to drive the sheet feed roller C110 is supplied from a later-described transportation motor M002 (see FIG. 9) on the side of the apparatus body A001 through a connection unit C110a. Hereinafter, it should be noted that the joints C105 will be treated as one joint for the convenience of explanation.

Further, the back body C101 includes a wiper C106 for wiping a later-described recording head in the printer unit, and an ink absorbent C107 for absorbing waste ink discharged from the printer unit. As described later, the recording head in the printer unit is reciprocated in the main scan direction indicated by the arrow A. While the media pack C100 is being removed from the apparatus body A001, the shutter C102 is slid and set at the position indicated by the alternate long and two short dashed line in FIG. 4 to protect the joints C105, the wiper C106, the ink absorbent C107 and the like.

C (Printer Unit)

The printer unit B100 in the present embodiment is a serial printer having an inkjet recording head. In the following, the printer unit B100 will be explained separately for a part C-1 (printing operation unit), a part C-2 (printing medium transportation system) and a part C-3 (ink supply system).

C-1 (Printing Operation Unit)

Figure 6:
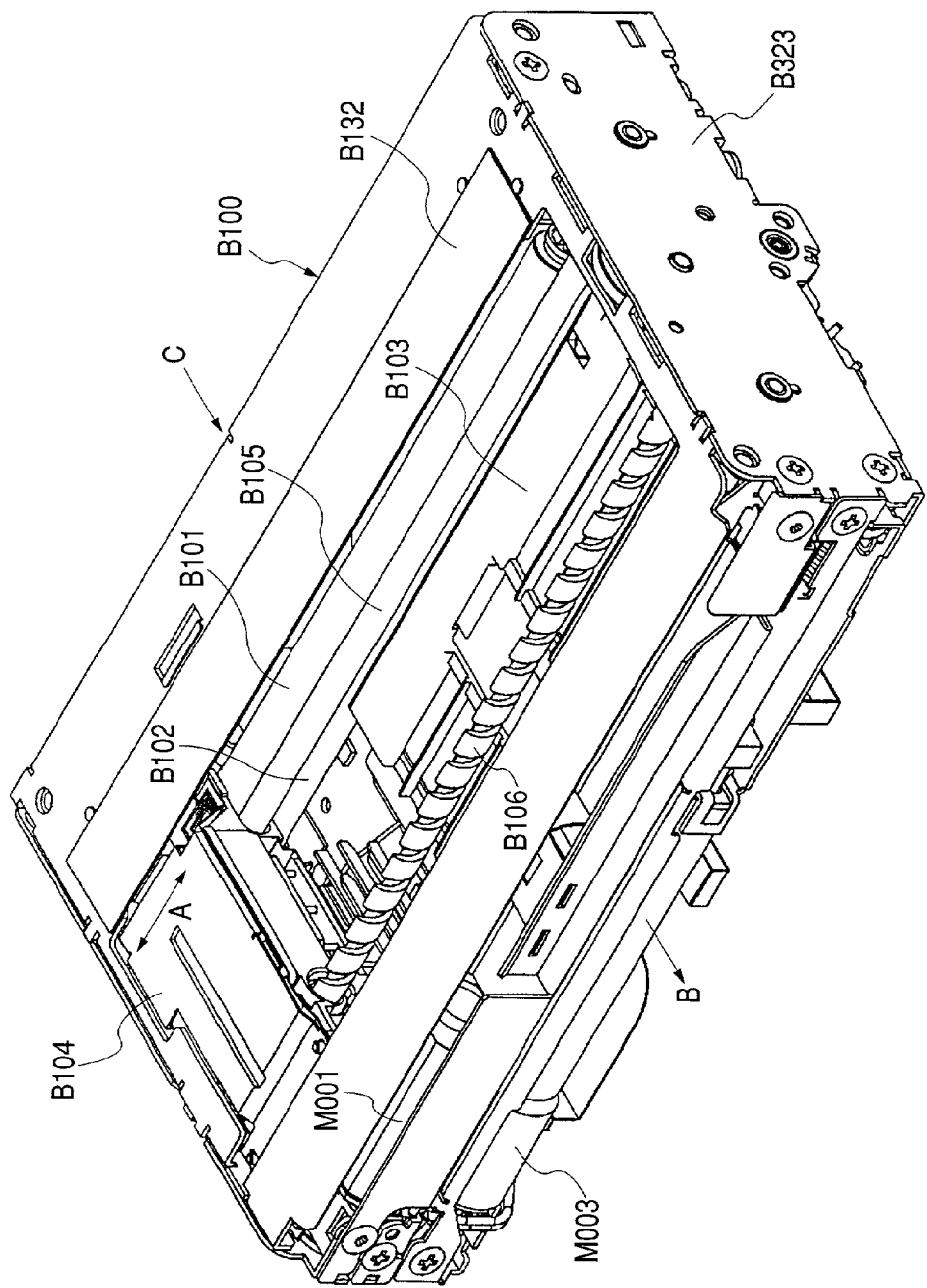
FIG. 6 is a perspective diagram showing a printer unit included in the main parts of FIG. 5.
Figure 7:
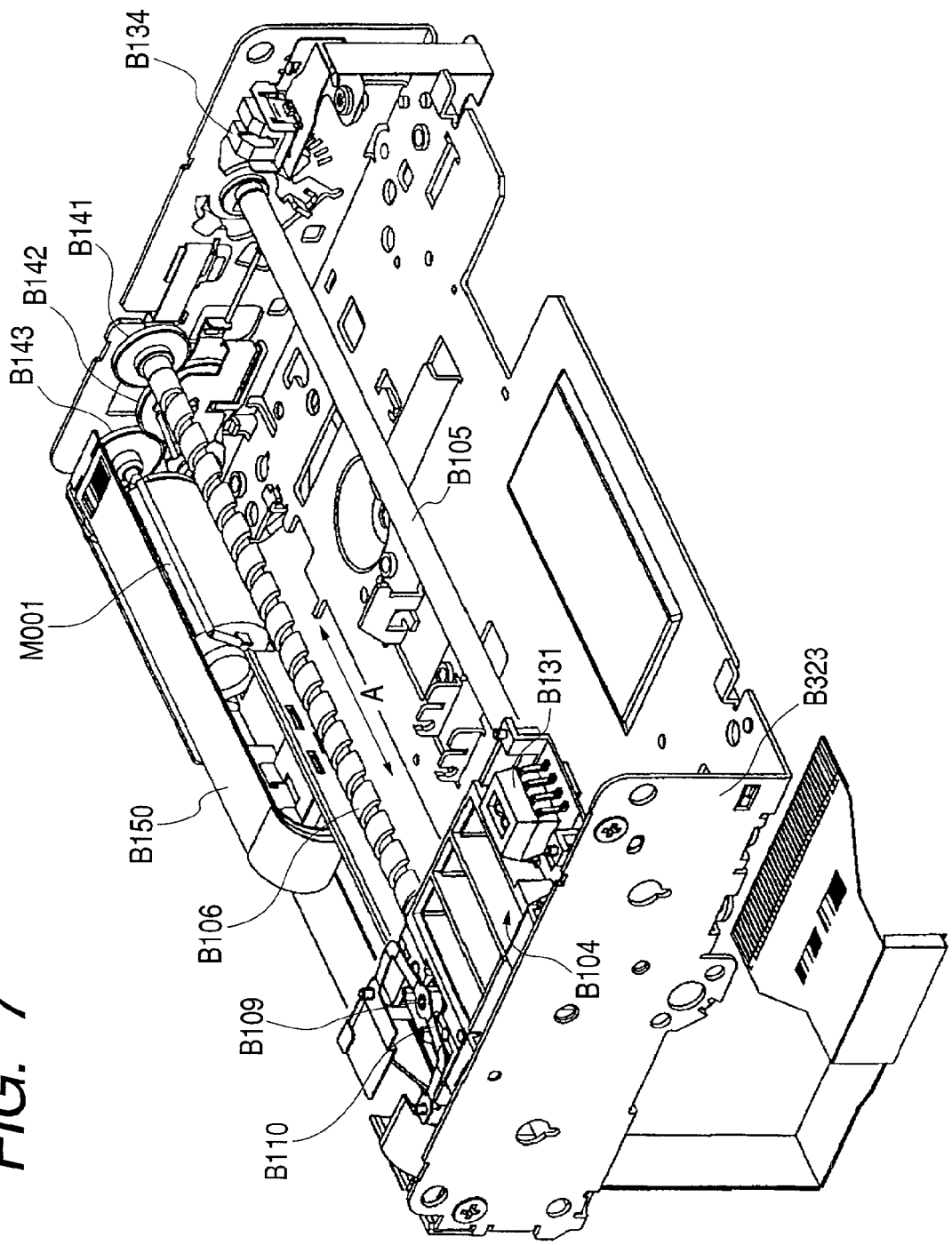
FIG. 7 is a perspective diagram showing the printer unit of FIG. 6 from which a part thereof has been removed.

FIG. 6 is a perspective diagram showing the entire printer unit B100, and FIG. 7 is a perspective diagram showing the printer unit B100 from which a part thereof has been removed.

At a certain position within the body of the printer unit B100, as shown in FIG. 5, the head of the media pack C100 mounted to the apparatus body A001 is positioned. The printing medium C104 transported from the media pack C100 in the direction C is sandwiched between an LF (line feed) roller B101 and an LF pinch roller B102 in the later-described printing medium transportation system, and also transported in the sub scan direction indicated by the arrow B on a platen B103. Symbol B104 denotes a carriage which is reciprocated in the main scan direction A along a guide axis B105 and a lead screw B106.

Figure 8:
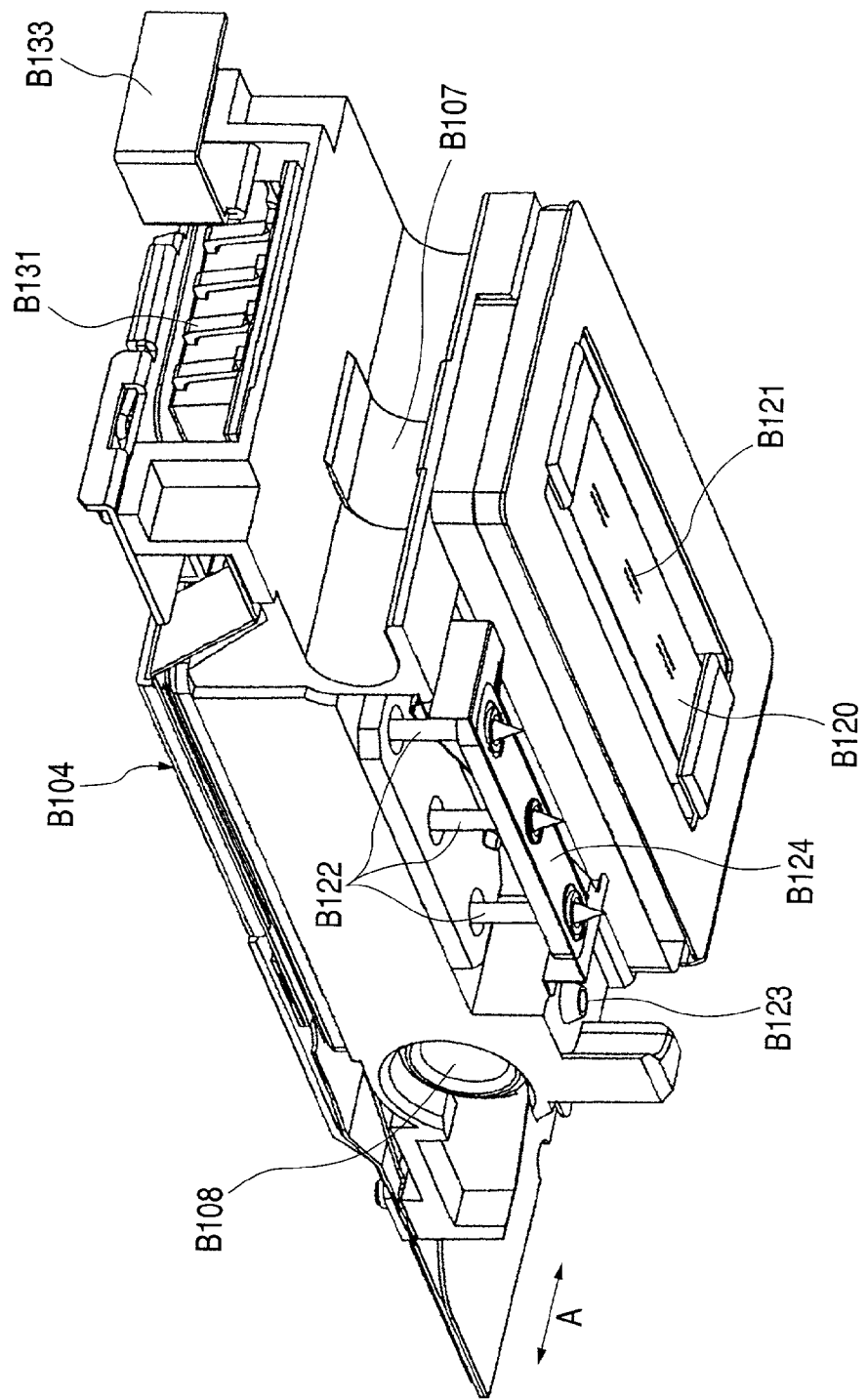
FIG. 8 is a perspective diagram showing a carriage contained in the printer unit of FIG. 6.

As shown in FIG. 8, a bearing B107 for the guide axis B105 and a bearing B108 for the lead screw B106 are provided on the carriage B104. Further, as shown in FIG. 7, at a certain position of the carriage B104, a screw pin B109 protruding toward the inside of the bearing B108 is mounted by a spring B110. Thus, the end of the screw pin B109 is fitted into the spiral groove formed on the periphery of the lead screw B106, whereby the rotation of the lead screw B106 is converted into the reciprocation of the carriage B104.

Further, the inkjet recording head B120 capable of emitting the Y, M, C inks and a subtank (not shown) for holding the inks supplied to this recording head B120 are mounted on the carriage B104, and plural ink emission outlets B121 (see FIG. 8) are arranged and formed along the direction intersecting the main scan direction A (i.e., along the direction perpendicular to the main scan direction A in the present embodiment) on the inkjet recording head B120. The ink emission outlets B121 constitute nozzles capable of emitting the inks supplied from the subtank. Incidentally, an electrothermal converter provided at each nozzle can be used as a means for generating energy to emit the ink. Namely, when the electrothermal converter is thermally driven, this converter generates bubbles in the ink within the nozzle, whereby ink droplets are emitted from the ink emission outlet B121 due to such bubble energy.

The capacity of the subtank is smaller than that of each ink pack C103 in the media pack C100, and this capacity corresponds to a capacity capable of containing a quantity of the ink necessary in the image recording of at least one printing medium C104. In the subtank, an ink containing part for each of the Y, M and C inks includes an ink supply unit and a negative pressure introduction unit. These three ink supply units are respectively connected to corresponding hollow needles B122, and these three negative pressure introduction units are connected to a supply air port B123 in common. As described later, when the carriage B104 is shifted to its home position as shown in FIG. 6, the ink is supplied from the ink packs C103 of the media pack C100 to the subtank.

In the carriage B104 of FIG. 8, symbol B124 denotes a needle cover. While the hollow needles B122 are not being connected to the joints C105, the needle cover B124 is at the position to protect the hollow needles B122 by the force of a spring as shown in FIG. 8. On the other hand, when the hollow needles B122 are connected to the joints C105, the needle cover B124 is shifted against the force of the spring to release the protection of the hollow needles B122. The shifted position of the carriage B104 is detected by an encoder sensor B131 on the side of the carriage B104 and a linear scale B132 (see FIG. 6) on the side of the body of the printer unit B100. Further, the fact that the carriage B104 has been shifted to its home position is detected by an HP (home position) flag B133 on the side of the carriage B104 and an HP sensor B134 (see FIG. 7) on the side of the body of the printer unit B100.

In FIG. 7, at the both ends of the guide axis B105, spindles (not shown) are provided respectively at the eccentric position from the center axis of the guide axis. When the guide axis B105 is rotatably adjusted around the spindle, the position of the carriage B104 is adjusted, whereby the distance between the recording head B120 and the printing medium C104 on the platen B103 (also called an inter-sheet distance) is adjusted. The lead screw B106 is rotatably driven by a carriage motor M001 through a screw gear B141, an idle gear B142 and a motor gear B143. Symbol B150 denotes a flexible cable which electrically connects a later-described control system with the recording head B120.

As the recording head B120 is being shifted in the sub scan direction A together with the carriage B104, the ink is emitted from the ink emission outlet B121 in response to the image signal, whereby the image of one line is recorded on the printing medium set on the platen B103. By repeating such a recording operation of one line by the recording head B120 and a predetermined-quantity printing medium transportation operation in the sub scan direction B by the later-described printing medium transportation system, the images are sequentially recorded on the printing medium.

C-2 (Printing Medium Transportation System)

Figure 9:
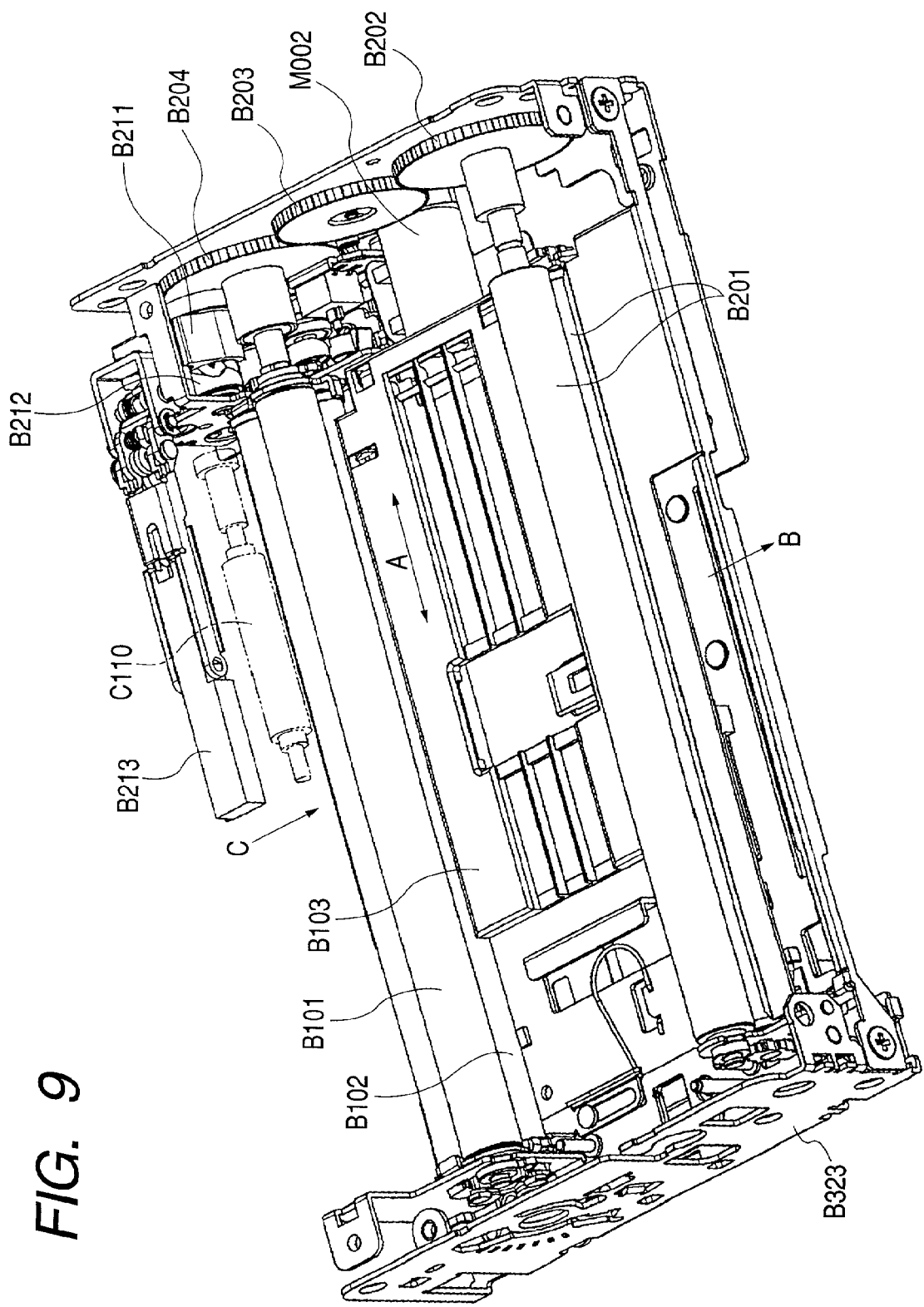
FIG. 9 is a perspective diagram showing a structural part of a printing medium transportation system contained in the printer unit of FIG. 6.

FIG. 9 is the perspective diagram showing the structural part of the printing medium transportation system in the printer unit B100. In FIG. 9, symbol B201 denotes a pair of sheet discharge rollers. The upper one roller of the pair of sheet discharge rollers B201 is driven by the transportation motor M002 through a sheet discharge roller gear B202 and a relay gear B203. Similarly, the above LF roller B101 is driven by the transportation motor M002 through an LF roller gear B204 and the relay gear B203. The sheet discharge roller B201 and the LF roller B101 transport the printing medium C104 toward the sub scan direction B by the forward-rotation driving force of the transportation motor M002.

On the other hand, when the transportation motor M002 is reversely rotated, a pressure board head B213 and an unillustrated lock mechanism are driven through a changeover slider B211 and a changeover cam B212, and also the driving force is transferred to the sheet feed roller C110 on the side of the media pack C100. Namely, the pressure board head B213 is shifted through a window C102A (see FIG. 4) by the reverse-rotation driving force of the transportation motor M002 to depress downward the stacked printing media C104 in the media pack C100 (FIG. 4). Thus, the lowermost printing medium C104 in FIG. 4 is pushed onto the sheet feed roller C110 in the media pack C100. Further, the unillustrated lock mechanism locks the media pack C100 by the reverse-rotation driving force of the transportation motor M002 so as to inhibit it from detaching the media pack C100 from the apparatus body A001. Further, the sheet feed roller C110 on the side of the media pack C100 transports the lowermost printing medium C104 in FIG. 4 toward the direction C by the transferred reverse-rotation driving force of the transportation motor M002.

As above, by the reverse rotation of the transportation motor M002, the printing medium C104 is fed from the media pack C100 in the direction C. Then, by the forward rotation of the transportation motor M002, the fed printing medium C104 is transported in the direction B.

C-3 (Ink Supply System)

Figure 10:
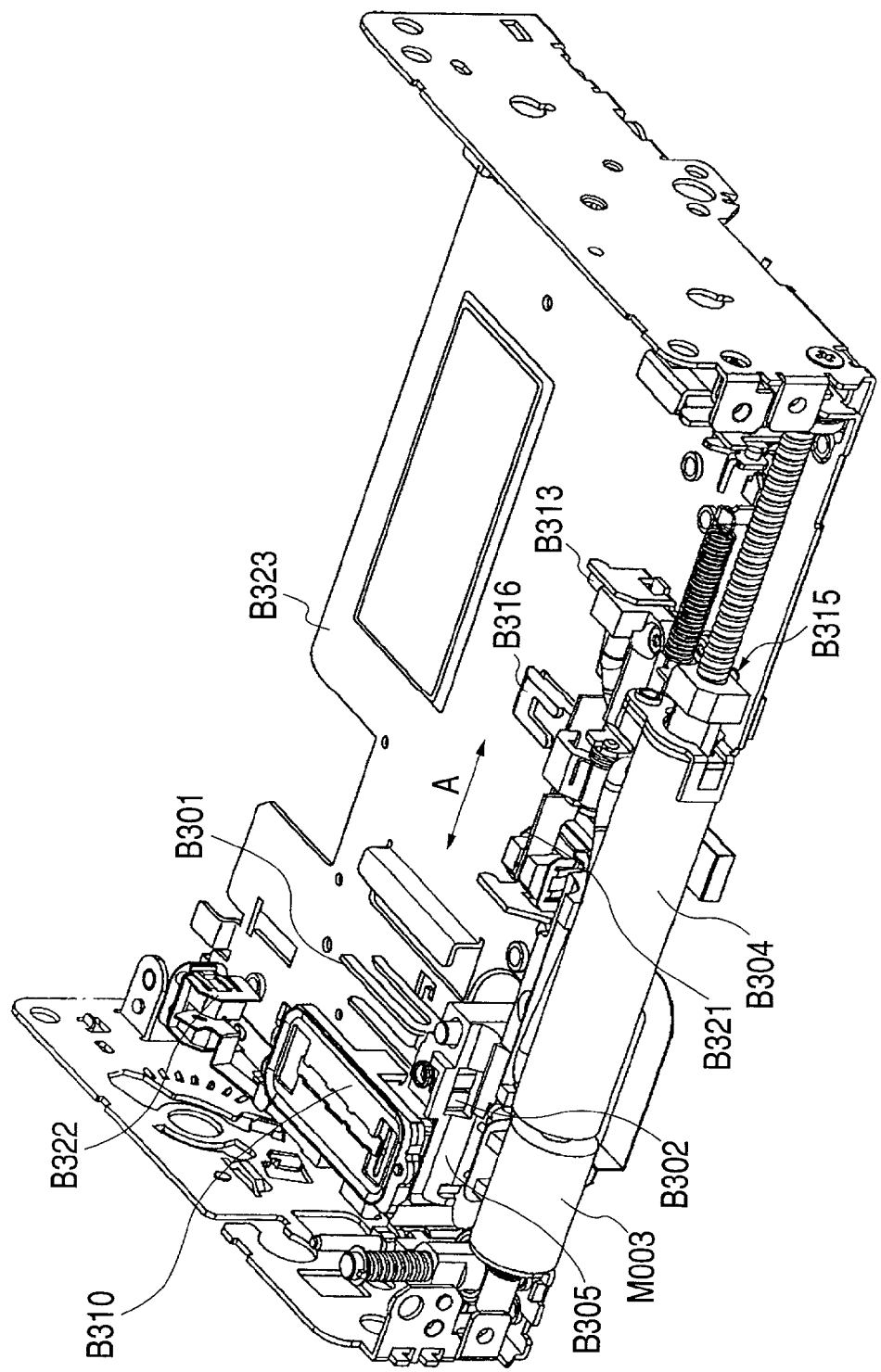
FIG. 10 is a perspective diagram showing a structural part of an ink supply system contained in the printer unit of FIG. 6.
Figure 11:
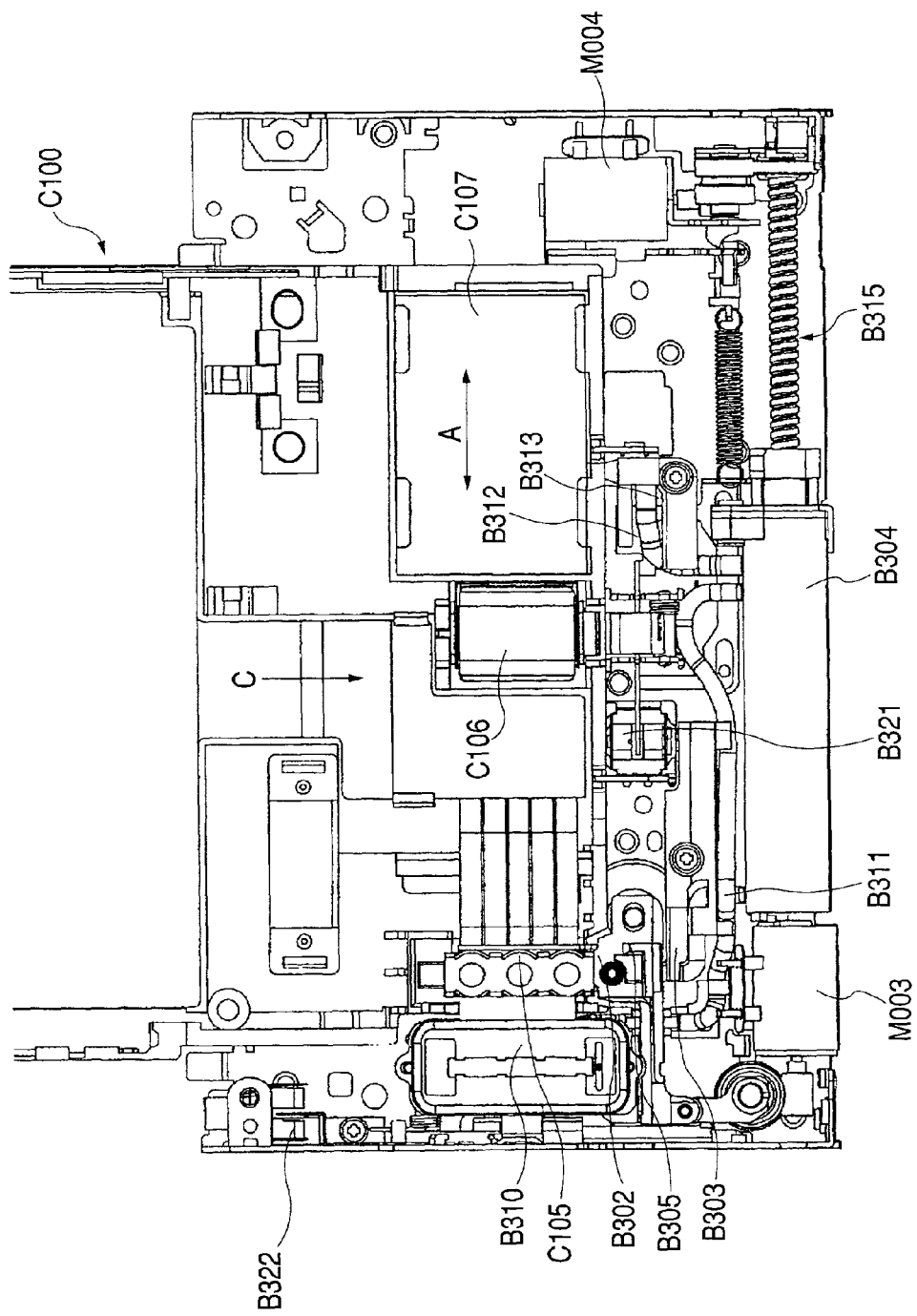
FIG. 11 is a plan view showing a state that the media pack is mounted to the structural part of the ink supply system of FIG. 10.

FIG. 10 is a perspective diagram showing the structural part of the ink supply system contained in the printer unit B100, and FIG. 11 is a plan view showing a state that the media pack C100 is mounted to the structural part of the ink supply system.

The joint C105 of the media pack C100 mounted to the printer unit B100 is positioned below the needle B122 (see FIG. 8) on the side of the carriage B104 shifted to its home position. A joint fork B301 (see FIG. 10) positioned below the joint C105 is provided on the body of the printer unit B100, and the joint C105 is connected to the needle B122 when the joint C105 is moved upward by the joint fork B301. Thus, an ink supply path is formed between the ink pack C103 on the side of the media pack C100 and the ink supply unit of the subtank on the side of the carriage B104. Further, a supply joint B302 positioned below the supply air port B123 (see FIG. 8) shifted to its home position is provided on the body of the printer unit B100. The supply joint B302 is connected to a pump cylinder B304 for a pump acting as a negative pressure generator, through a supply tube B303. The supply joint B302 is moved upward by a joint lifter B305 and thus connected to the supply air port B123 on the side of the carriage B104. Thus, a negative pressure introduction path is formed between the negative pressure introduction unit of the subtank on the side of the carriage B104 and the pump cylinder B304. The joint lifter B305 moves up and down the joint fork B301 together with the supply joint B302 by the driving force of a joint motor B003.

In the negative pressure introduction unit of the subtank, a gas-liquid separation member (not shown) which allows air to pass but does not allow ink to pass is provided. The gas-liquid separation member allows the air in the subtank sucked through the negative pressure introduction path, to pass, whereby the ink is supplied from the media pack C100 to the subtank. Then, when enough ink is supplied in the subtank reaches the gas-liquid separation member, the gas-liquid separation member prevents the ink from passing, and the supply of the ink is automatically stopped. Since the gas-liquid separation member is provided in the ink supply unit of the ink holding part for each ink disposed in the subtank, the supply of the ink is automatically stopped for each ink holding part.

Further, on the body of the printer unit B100, a suction cap B310 is provided to be able to cap the recording head B120 (see FIG. 8) on the side of the carriage B104 shifted to its home position. Negative pressure is introduced from the pump cylinder B304 into the suction cap B310 through a suction tube B311, whereby the ink can be sucked and discharged from the ink emission outlet B121 on the recording head B120 (this operation is called a suction recovery process). Further, if necessary, the recording head B120 emits into the suction cap B310 the ink not contributing to image recording (this operation is called a preemission process). The ink in the suction cap B310 is discharged from the pump cylinder B304 to the ink absorbent C107 in the media pack C110, through a waste ink tube B312 and a waste ink joint B313.

The pump cylinder B304, a pump motor M004 which reciprocates the pump cylinder B304, and the like constitute a pump unit B315. The pump motor M004 also functions as the driving source to move a wiper lifter B316 (see FIG. 10) up and down. The wiper lifter B316 lifts up the wiper C106 of the media pack C100 mounted to the printer unit B100 so as to shift the wiper C106 to the position where it can wipe the recording head B120.

In FIGS. 10 and 11, symbol B321 denotes a pump HP sensor which detects that the operation position of the pump structured by the pump cylinder B304 is at its home position. Further, symbol B322 denotes a joint HP sensor which detects that the ink supply path and the negative pressure introduction path have been formed. Symbol B323 denotes a chassis which structures the body of the printer unit B100.

D (Signal Processing System)

Figure 12:
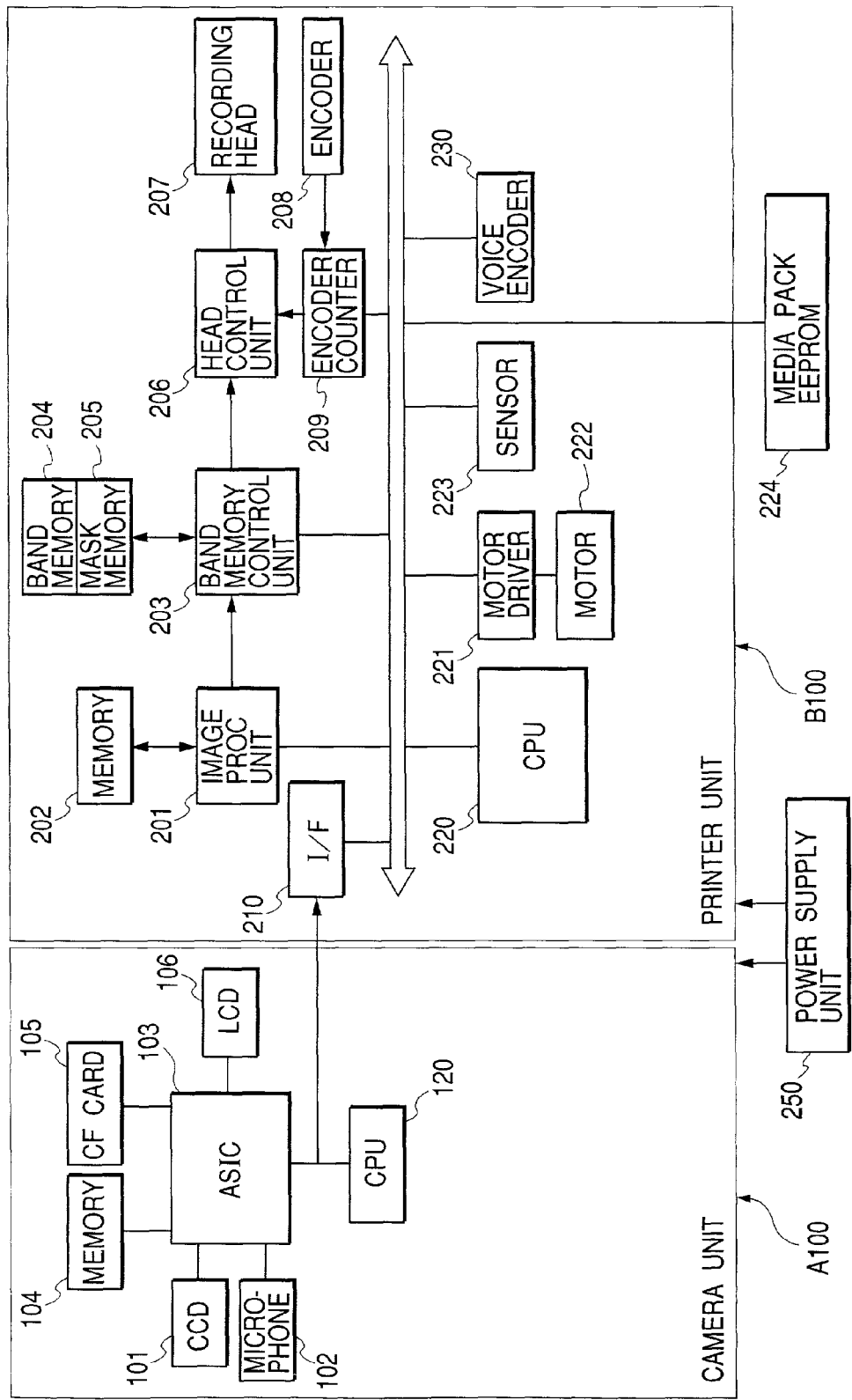
FIG. 12 is a block diagram schematically showing a camera unit and a printer unit in the camera of FIG. 1.

FIG. 12 is a block diagram schematically showing the camera unit A100 and the printer unit B100.

In the camera unit A100, numeral 101 denotes a CCD which acts as an image pickup element, numeral 102 denotes a microphone which is used for voice (or audio) input, numeral 103 denotes an ASIC (application specific integrated circuit) which performs a hardware process, numeral 104 denotes a first memory which temporarily stores image data and the like, numeral 105 denotes a CF card which stores a taken (or picked up) image (corresponding to the CF card A107), numeral 106 denotes an LCD which displays the taken image or a reproduced image (corresponding to the liquid crystal display unit A105), and numeral 120 denotes a first CPU (central processing unit) which controls the camera unit A100 as a whole.

In the printer unit B100, numeral 210 denotes an interface between the camera unit A100 and the printer unit B100 to permit communication with each other, numeral 201 denotes an image processing unit (including a binarization processing unit for binarizing image data), numeral 202 denotes a second memory which is used in the image process, numeral 203 denotes a band memory control unit, numeral 204 denotes a band memory, numeral 205 denotes a mask memory, numeral 206 denotes a head control unit, numeral 207 denotes a recording head (corresponding to the recording head B120), numeral 208 denotes an encoder (corresponding to the encoder sensor B131), numeral 209 denotes an encoder counter, numeral 220 denotes a second CPU which controls the printer unit B100 as a whole, numeral 221 denotes a motor driver, numeral 222 denotes a motor (corresponding to the motor M001, M002, M003 or M004), numeral 223 denotes a sensor (including the HP sensors B134, B321 and B322), numeral 224 denotes an EEPROM (also called an information storage unit) built in the media pack C100, numeral 230 denotes a voice encoder, and numeral 250 denotes a power supply unit which supplies power to the entire apparatus (corresponding to the battery A108).

Figure 13:
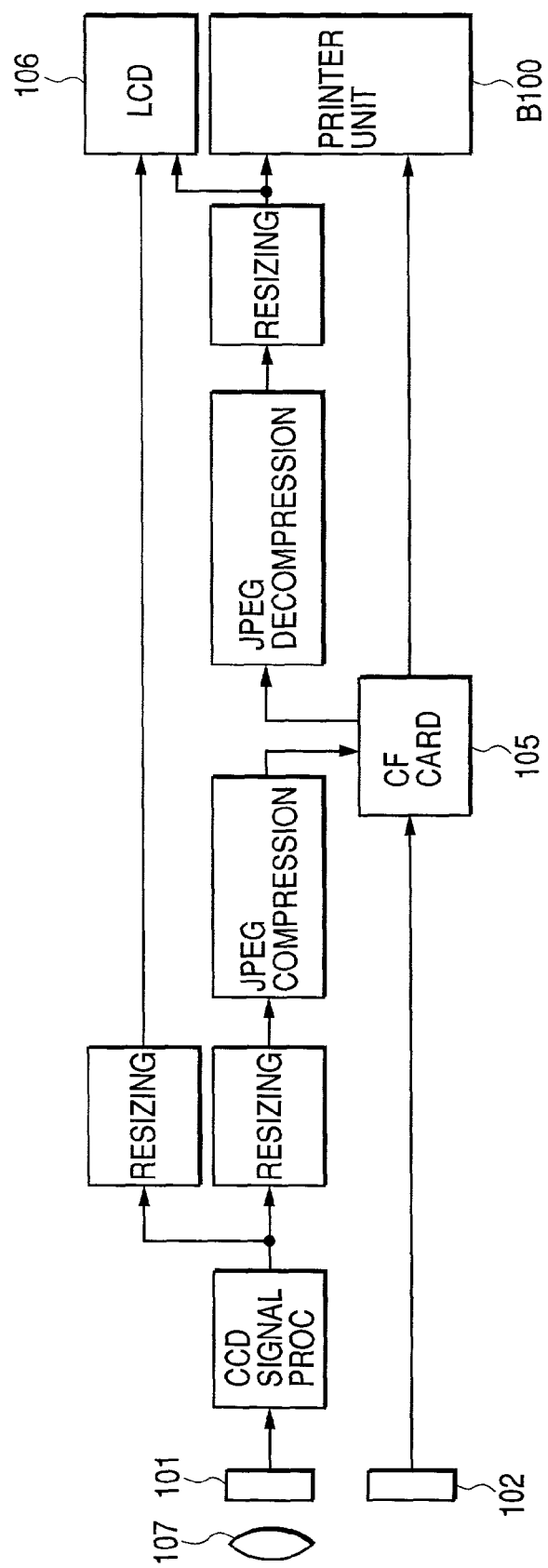
FIG. 13 is a diagram for explaining a signal process in the camera unit of FIG. 12.

FIG. 13 is a diagram for explaining a signal process in the camera unit A100. In a photographing mode, the image photographed (picked up) by the CCD 101 through a lens 107 is subjected to the signal process (a CCD signal process) by the ASIC 103 and converted into a YUV brightness two color difference signal. Then, the signal is resized to have predetermined resolution, subjected to JPEG (Joint Photographic Experts Group) compression, and recorded on the CF card 105. On the other hand, the voice is input from the microphone 102, and then recorded on the CF card 105 through the ASIC 103. In this case, the voice can be recorded at the same time as photographing the image or recorded as post recording after the image photographing operation. In a reproduction mode, a JPEG image is read from the CF card 105, subjected to JPEG decompression, resized to have display resolution, and then displayed on the LCD 106.

Figure 14:
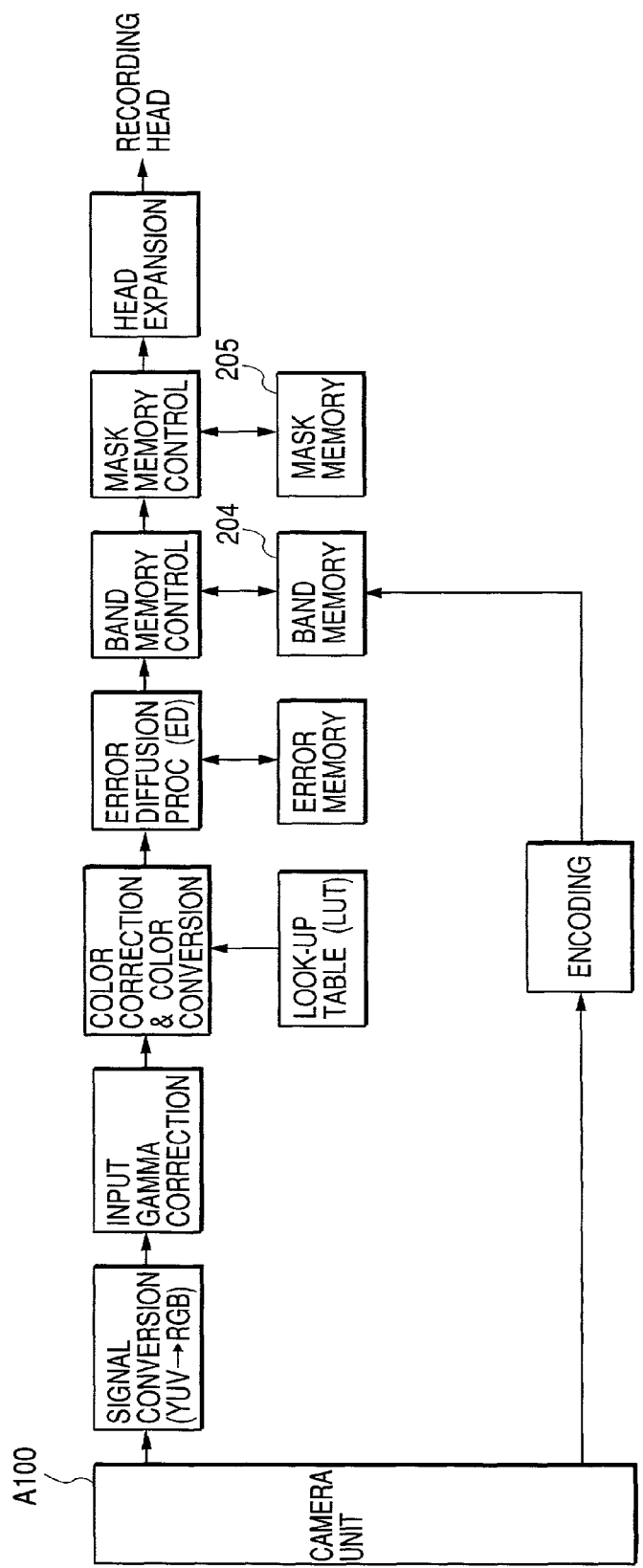
FIG. 14 is a diagram for explaining a signal process in the printer unit of FIG. 12.

FIG. 14 is a diagram for explaining a signal process in the printer unit B100.

The image reproduced on the side of the camera unit A100 (i.e., the image read from the CF card 105) is subjected to JPEG decompression by the ASIC 103, and resized to have printing resolution. Such resized image data (YUV) is transferred to the printer unit B100 through the interface 210. As shown in FIG. 14, in the printer unit B100, the image data transferred from the camera unit A100 is subjected to an image process by the image processing unit 201, and converted into R (red), G (green) and B (blue) signals. The R, G and B signals are subjected to input gamma correction according to a camera characteristic, subjected to color correction and color conversion by using an LUT (look-up table), and converted into binary signals for printing. In the binarization process, the second memory 202 is used as an error memory to perform an ED (error diffusion) process. In the present embodiment, the binarization processing unit of the image processing unit 201 performs the ED process, but another process, such as a binarization process using a dither pattern, or the like can be adopted. Then, printing data obtained by the binarization process is once stored in the band memory 204 under the control of the band memory control unit 203. An encoder pulse supplied from the encoder 208 is input to the encoder counter 209 of the printer unit B100 every time the carriage B104 equipped with the recording head 207 and the encoder 208 is shifted for a certain distance. Thus, the printing data is read from the band memory 204 and the mask memory 205 in synchronism with the input encoder pulse, and the head control unit 206 controls the recording head 207 on the basis of the read printing data, whereby the image recording is performed.

The band memory control in FIG. 14 is as follows.

Plural nozzles of the recording head 207 are linearly arranged to give, e.g., a density of 1200 dpi (dots per inch). In order to record the image by using such a recording head 207, when it causes the carriage to perform scanning once, it is necessary to previously generate recording data (i.e., recording data of one scan) of the number of nozzles in a sub scan direction (also called a longitudinal or Y direction hereinafter) and of a recording area in a main scan direction (also called a lateral direction or X direction hereinafter). The recording data is generated by the image processing unit 201, and the generated image data is once stored in the band memory 204 by the band memory control unit 203. After the recording data of one scan was stored in the band memory 204, it causes the carriage to perform the scanning in the main scan direction. At this time, the encoder pulses input from the encoder 208 are counted by the encoder counter 209, the recording data is read from the band memory 204 in accordance with the encoder pulse, and ink droplets are emitted from the recording head 207 on the basis of the read image data. In a case where a two-way recording system for recording images in the forward scan and the reverse scan of the recording head 207 is adopted (i.e., forward-way recording and reverse-way recording are performed), the image data is read from the band memory 204 in accordance with the scan direction of the recording head 207. For example, in the forward-way recording, addresses of the image data read from the band memory 204 are sequentially incremented, while in the reverse-way recording, the addresses of the image data read from the band memory 204 are sequentially decremented.

Actually, when the image data (C, M, Y) generated by the image processing unit 201 is written in the band memory 204 and thus the image data of one band is prepared, the scanning of the recording head 207 can be performed. Then, the scanning of the recording head 207 is performed, the image data is read from the band memory 204, and the image is recorded by the recording head 207 on the basis of the read image data. During such a recording operation, the image data to be next recorded is generated by the image processing unit 201 and written at the area corresponding to its recording position in the band memory 204.

Thus, in the band memory control, the working to write the recording data (C, M, Y) generated by the image processing unit 201 in the band memory 204 and the working to read the image data (C, M, Y) to be transferred to the head control unit 206 in synchronism with the carriage scan operation are changed over.

The mask memory control in FIG. 14 is as follows.

The mask memory control is necessary when a multipass recording system is adopted. In the multipass recording system, a recording image of one line having the width corresponding to the length of the nozzle arrangement of the recording head 207 is recorded divisionally by plural scans of the recording head 207. Namely, it is assumed that a transportation quantity of the printing media intermittently transported in the sub scan direction is 1/N of the length of the nozzle arrangement. For example, if N=2, the recording image of one line is recorded divisionally by two scans (two-pass recording). Further, if N=4, the recording image of one line is recorded divisionally by four scans (four-pass recording). Similarly, eight-pass recording is performed if N=8, and 16-pass recording is performed if N=16. Therefore, the recording image of one line is completed by the plural scans of the recording head 207.

Actually, mask data to allocate the image data to the plural scans of the recording head 207 has been stored in the mask memory 205. Then, the recording head 207 emits the ink for the image recording on the basis of AND data of the mask data and the image data.

Further, in FIG. 14, the voice data stored on the CF card 105 is transferred to the printer unit B100 through the interface 210, as well as the image data. In the printer unit B100, the voice data is encoded by the voice encoder 230, and recorded as code data in the image to be printed. If it is unnecessary to enter the voice data in the printing image, or if the image having no voice data is printed, the encoded voice data is not printed, but only the image is printed, of course.

In the present embodiment, the camera with a built-in printer that the camera unit A 100 and the printer unit B100 are integrally structured was explained. However, even in a structure that the camera unit A100 and the printer unit B100 are separately provided and connected to each other through the interface 210, the same function as above can be achieved.

(Typical Structure)

Hereinafter, the typical structure in the present embodiment will be explained.

Figure 15:
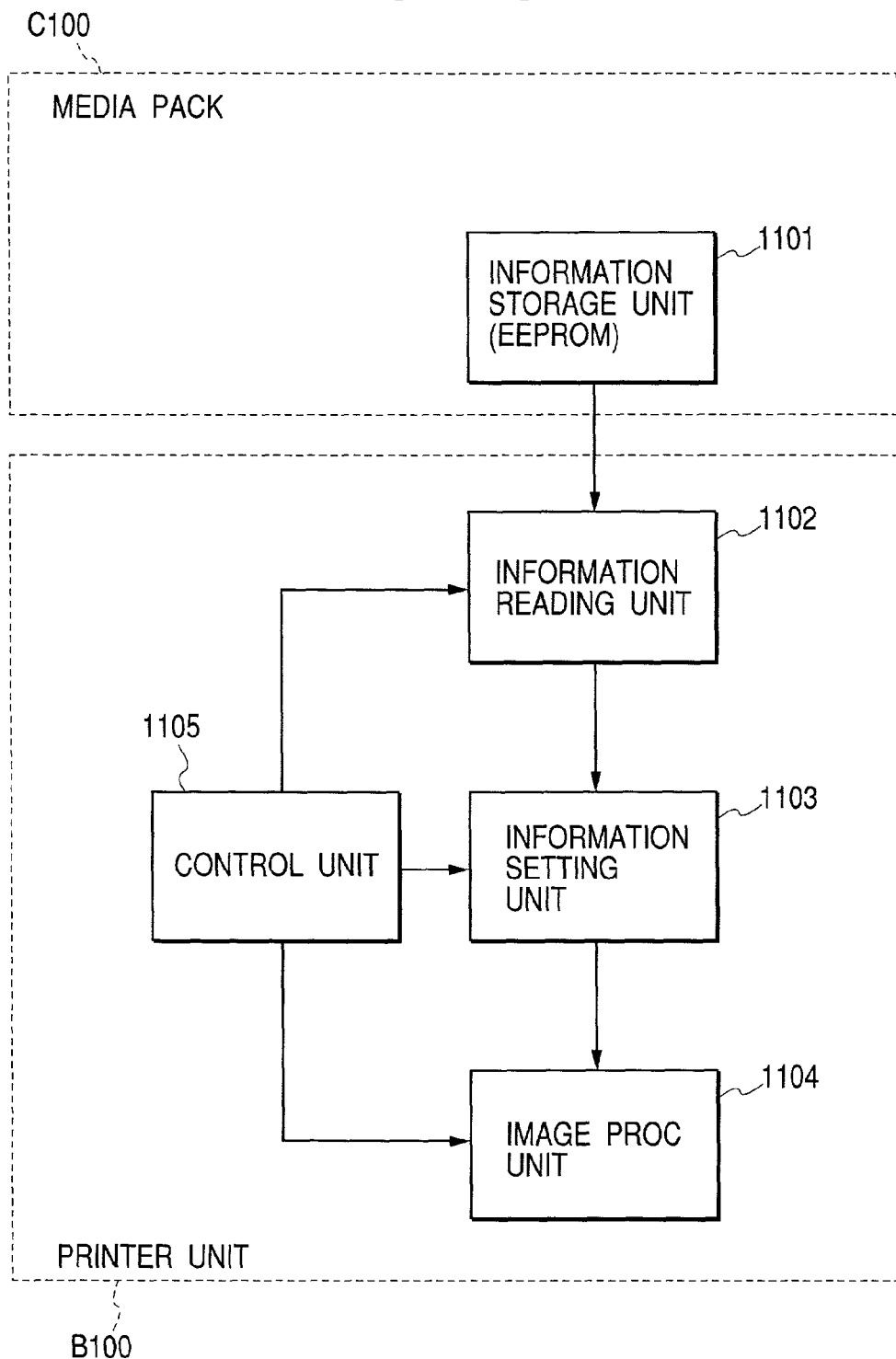
FIG. 15 is a block diagram showing a structure particularly concerning the main parts of the present invention extracted from the basic structure of the camera with built-in printer shown in FIG. 12.

FIG. 15 is a block diagram showing the structure particularly concerning the main parts of the present embodiment extracted from the basic structure of the camera with a built-in printer.

In FIG. 15, numerals 1102 to 1105 denote structural components on the side of the printer unit B100. Namely, numeral 1102 denotes an information reading unit, numeral 1103 denotes an information setting unit, numeral 1104 denotes an image processing system, and numeral 1105 denotes a control unit. Here, the information reading unit 1102, the information setting unit 1103 and the control unit 1105 can be structured as a part of the function executed by the CPU 220 of the printer unit B100 shown in FIG. 12 or as predetermined hardware (an interface, a RAM (random-access memory), a ROM (read-only memory) and the like). Further, the image processing system 1104 includes the image processing unit 201 and the second memory 202 in the structure of FIG. 12.

In an information storage unit 1101 provided in the form of EEPROM within the media pack C100, data representing a kind of printing medium, a kind of ink, an ink color and the like of the printing medium held in the media pack C100 have been stored.

Figure 16:
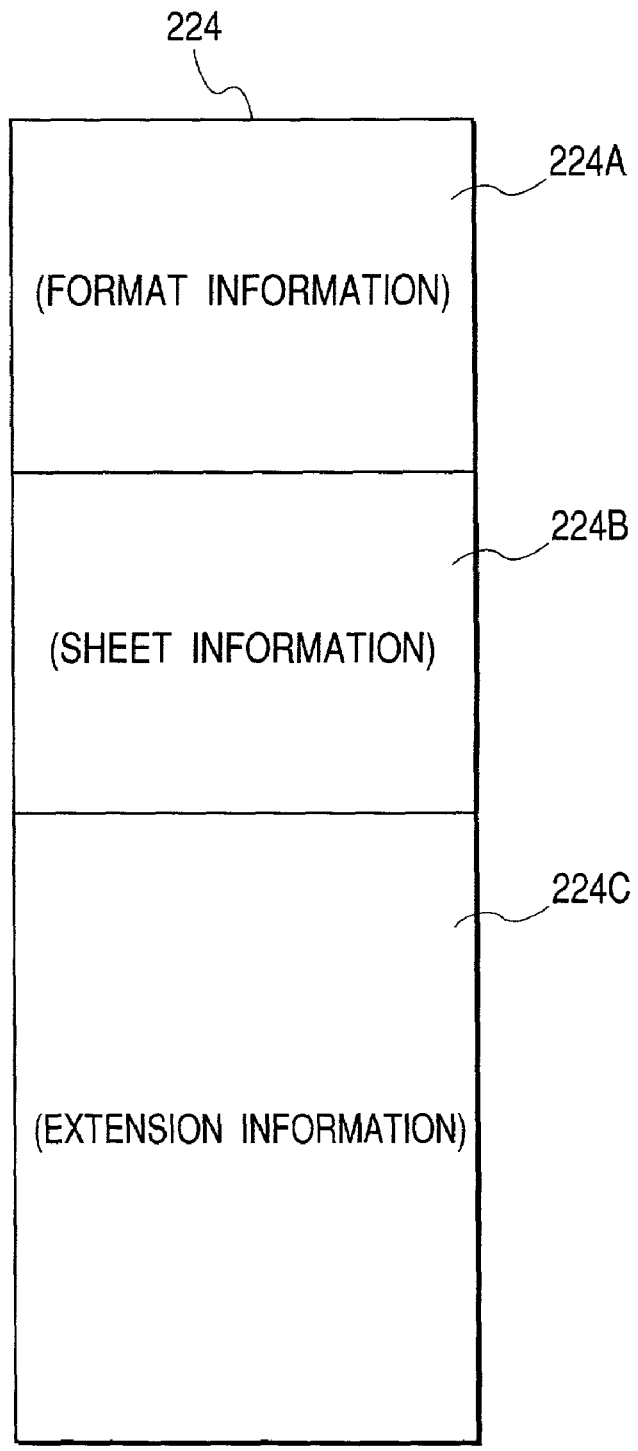
FIG. 16 is a diagram showing an example of a data structure of information stored in an information storage unit of the media pack.

FIG. 16 is a diagram showing an example of the data structure of the information stored in the information storage unit 224. An area 224A for storing format information is positioned at the head of the entire information storage area. The format information is used to designate a format of subsequent information. An area 224B for storing sheet information is positioned subsequent to the area 224A. The sheet information is used to provide information of a kind of sheet set in the media pack C100, and the format of this information can be arbitrarily determined. The data is ordinarily produced only from the format information and the sheet information, and the data format of such a structure is called a basic format hereinafter.

On the other hand, there is a case where, since a kind of held printing medium is specific because, e.g., this printing medium is the one newly developed or provided, image processing parameters preset in the image processing system 1104 of the printer unit B100 can not correspond to this kind. In consideration of such the case, an area 224C for storing extension information can be provided subsequent to the sheet information area 224B. The extension information can include a necessary part or all of the image processing parameters to be used in the printer unit B100 and their kinds. The data format of such a structure including the extension information is called an extension format hereinafter.

If the media pack C100 is inserted into the body of the printer unit B100, the media pack C100 is electrically connected to the printer unit B100 through connectors provided at their respective connection units. If such an electrical connection is detected, the control unit 1105 of the printer unit B100 causes the information reading unit 1102 to read the information stored in the information storage unit 224, and then transfers the read information to the information setting unit 1103. The information setting unit 1103 analyzes the received information and then transfers the data processed according to the analyzed result to the image processing system 1104, whereby the parameter for the image process is selected.

Figure 17:
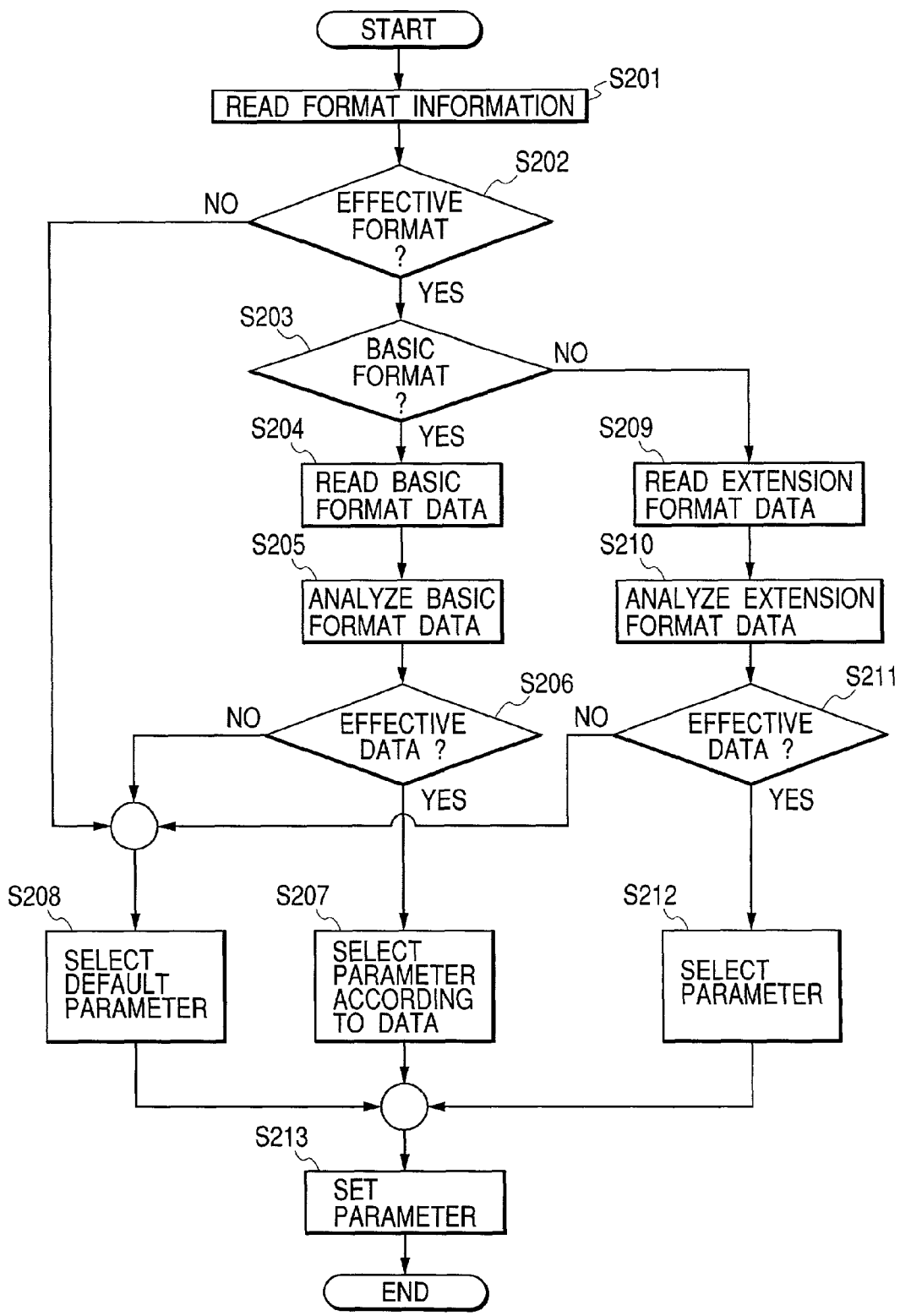
FIG. 17 is a flow chart showing an example of a detailed procedure of an image processing sequence executed based on the information captured from the information storage unit of the media pack.

FIG. 17 is a flow chart showing an example of a detailed procedure of such a series of sequences as above.

When it is detected that the media pack C100 is connected, the format information is read in a step S201. Next, in a step S202, the read format information is analyzed to judge whether or not this format information is effective. If judged that ineffective information is included in the read format information, the flow advances to a step S208 to select and set default parameters. Conversely, if judged in the step S202 that the format information is effective, the flow advances to a step S203 to further judge whether the information structure (or an information kind) is the basic format or the extension format.

If judged in the step S203 that the information kind is the basic format, the flow advances to a step S204 to read the sheet information which is the only data in the basic format. Next, in a step S205, the read sheet information is analyzed. Then, in a step S206, if the analyzed sheet information is ineffective, the flow advances to the step S208 to select and set the default parameters. Conversely, if the sheet information is effective in the step S206, the flow advances to a step S207 to select image processing parameters optimum for the sheet in accordance with the analyzed result.

It is assumed that the image processing parameters in this case are arbitrary and desired parameters, which are ordinarily used in the image processing system 1104 and the image processing unit 201 in the printer unit B100. For example, constants for gamma conversion, parameters for color conversion (a table in case of a table conversion system, masking coefficients in case of a masking system, etc.), and the like can be included in the image processing parameters. Besides, for example, parameters for a halftone process (dither mask size and threshold in case of a dither process, shape and coefficient of a diffusion window in case of the ED process, etc.), and the like can be included. The above parameters themselves have been previously stored in a memory or the like of the printer unit B100, and the correspondence between optimum parameters and sheet kinds have been stored in the form of a table.

If a division sheet or the like is used as the sheet kind, instructions to read an identical image plural times and then print the identical image plural times may be stored beforehand in the memory of the printer unit B100 or the EEPROM of the media pack C100.

In the steps S207 and S208, the optimum parameters are selected by using the above correspondence. The above is the operation for the data of the basic format.

On the other hand, if the data format is the extension format, the flow advances from the step S203 to a step S209. The data structure in case of the extension format is that at least one or more information is stored below the sheet information shown in FIG. 16. In the step S209, the extension information is completely read as well as the sheet information, and the read information is transferred to an information analysis unit. In a step S210, the received data is analyzed to specify the kind of parameter included. Then, in a step S211, it is judged whether or not the data is effective. If judged that the data is not effective, the flow advances to the step S208 to select default parameters.

Conversely, if judged in the step S211 that the data is effective, the flow advances to a step S212 to select the specified kind of parameter from the read extension information. With respect to the parameter not included in the extension information, the data previously stored in the printer unit B100 is adopted. However, if the parameter corresponding to the sheet information exists, such the parameter is adopted, while if such the parameter does not exist, a default parameter is adopted. The parameter selected through the above operation is then transferred to the image processing unit in a step S213.

As above, according to the present embodiment, the EEPROM acting as the information storage means is provided on the media pack C100, and the information stored in the EEPROM is read to select the optimum image processing parameter. Thus, the image processes suitable for the plural kinds of printing media C104 can be performed by simple handling. Further, by causing to store the image processing parameters themselves on the side of the media pack C100, a newly developed kind of printing medium and the like can be coped with easily and quickly. Further, by storing the image processing parameters matching with the kinds of sheet and ink, image processing requirements can be changed without any difficult handling even if, e.g., the media pack is changed.

In the present embodiment, the EEPROM is used as the structure of the information storage unit. This is effective in a case where the predetermined information is received from the side of the printer unit B100 and thus the held information is appropriately rewritten, e.g., in a case where the number of the held printing media C104 is reduced according to progress of recording. However, if it is enough for the side of the media pack C100 to present or provide the information on itself, the storage means, such as the EEPROM or the like whose held contents are rewritable, need not necessarily be used.

Further, in the image process which is performed according to the information (printing medium kind information, etc.) presented or provided by the media pack C100 for the image process suitable for the held printing medium, it is possible to include a process for changing and setting the number of passes in the above multipass recording and then performing image formation.

Further, the part or all of the image processing parameters and their kinds once captured as the extension information from one media pack may be held on the side of the printer unit B100 or the camera with a built-in printer even after this media pack has been released therefrom. Namely, in addition to the correspondence between the prestored basic image processing parameter and the sheet kind, it is possible to appropriately add the extension information newly obtained.

As explained above, according to the present invention, the means for storing the information concerning the kind of printing medium is provided on the printer consumable material holder, and it is possible to read the stored information and thus select the image processing parameter corresponding to this printing medium, whereby the image processes suitable for the plural printing media can be performed by simple handling. Further, the image processing parameters themselves are stored on the side of the printer consumable material holder, whereby it is possible to easily and quickly cope with the newly developed kind of printing medium and the like.

Second Embodiment

Hereinafter, the second embodiment of the present invention will be explained. However, since the basic structure of the apparatus in the second embodiment is the same as that in the first embodiment, the explanation thereof will be omitted.

Figure 18:
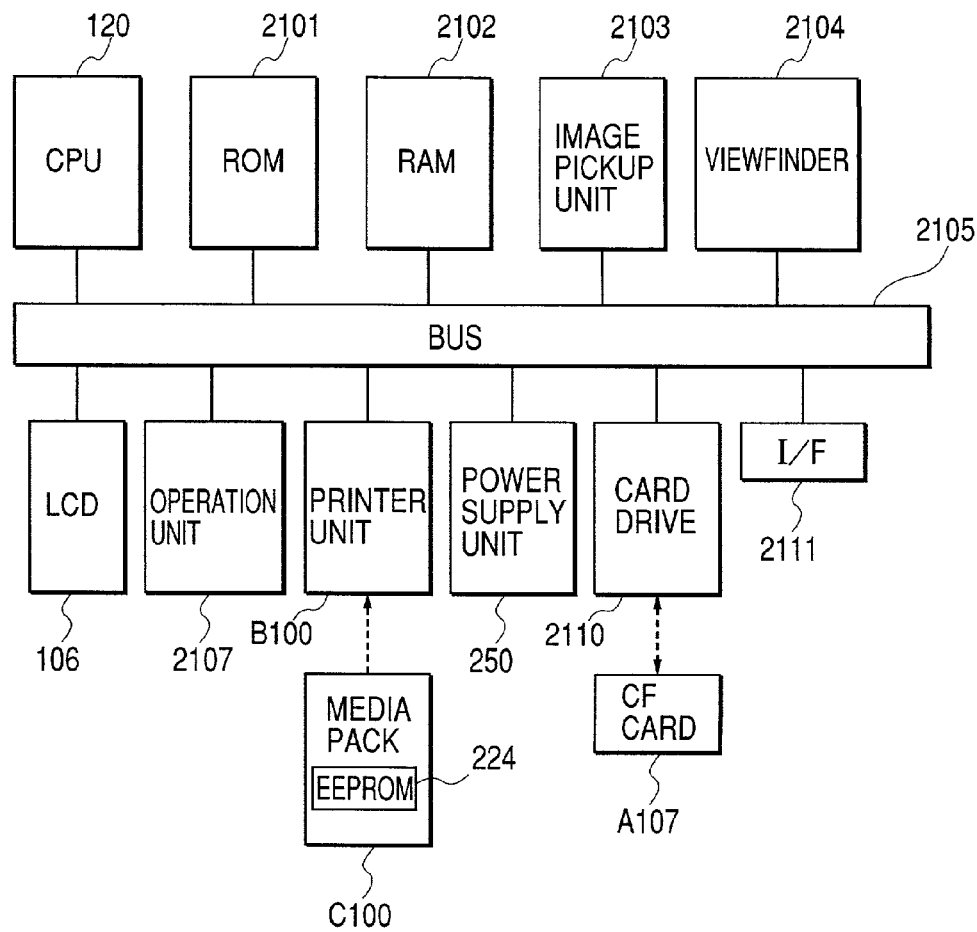
FIG. 18 is a block diagram showing an example of a control system to achieve the specific feature of the present invention, with respect to the basic structure of the camera with a built-in printer shown in FIG. 12.

FIG. 18 is a block diagram showing an example of a control system to achieve the specific structure of the present invention, with respect to the basic structure in the first embodiment.

In FIG. 18, numeral 2101 denotes a ROM in which a program corresponding to a display processing procedure (later described) of information to be printed by a printer unit B100 and executed by a CPU 120, and other fixed data are stored. Numeral 2102 denotes a RAM which is used as a working area for a case of executing an information display processing program, an area for temporarily storing photographing image information read from an image pickup unit 2103 including a CCD or the like being an image pickup element, and an area for temporarily storing image information read from a CF card A107 being a storage medium inserted into a card drive 2110. The RAM 2102 corresponds to the first memory 104. Numeral 2104 denotes a viewfinder which displays the image information to be captured and taken by the image pickup unit 2103.

As described above, an LCD 106 displays the image information to be captured and taken by the image pickup unit 2103. Further, the LCD 106 reproduces and displays the image information stored in the CF card A107 and captured through the card drive 2110. Numeral 2107 denotes an operation unit which provides a group of keys including a release button A104 (FIG. 19) and can be handled by a user.

As described above, the printer unit B100 is to print photographed and taken images and the like. When a media pack C100 being a printer consumable material holder is mounted, sheets are supplied and replenished to the printer unit B100, whereby the printer unit B100 can perform a printing operation. Further, the printer unit B100 reads information written on an EEPROM 224 of the media pack C100. Further, the media pack C100 may contain the ink to be supplied to the printer unit B100. Further, in the EEPROM 224, in addition to size and kind of the sheet held in the media pack C100, information of the number of sheets or the like is stored.

The card drive 2110 stores the image information captured and taken by the image pickup unit 2103, on the CF card A107, or reads the image information stored on the CF card A107. Numeral 2111 denotes an I/F (interface) which exchanges the image information with an external apparatus such as a personal computer or the like through USB (Universal Serial Bus) communication or the like.

Operation power is supplied from a power supply unit 250 to each part of the above control system. Numeral 2105 denotes a CPU bus by which the CPU 120, the ROM 2101, the RAM 2102, the image pickup unit 2103, the viewfinder 2104, the LCD 106, the operation unit 2107, the printer unit B100, the power supply unit 250, the card drive 2110, and the I/F 2111 are connected to others. It should be noted that the CPU bus 2105 is a generic name of an address bus for transferring an address signal, a control bus for transferring a control signal, and data bus for transferring various data.

Figure 19:
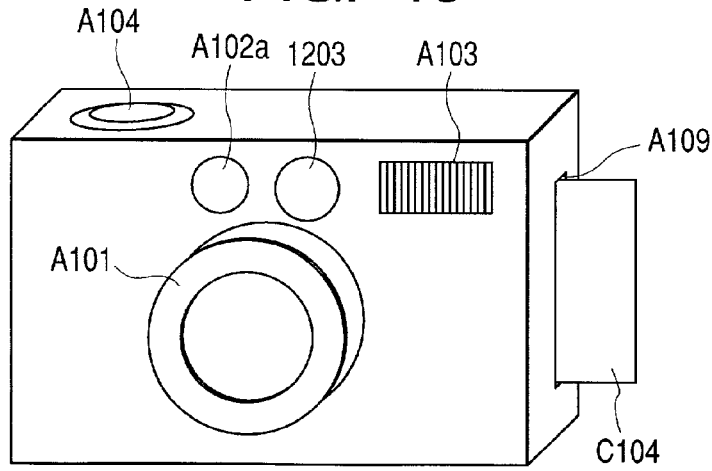
FIG. 19 is a diagram schematically showing the camera with a built-in printer shown in FIG. 12, i.e., a perspective diagram in which the camera is viewed from upper right of the front.
Figure 20:
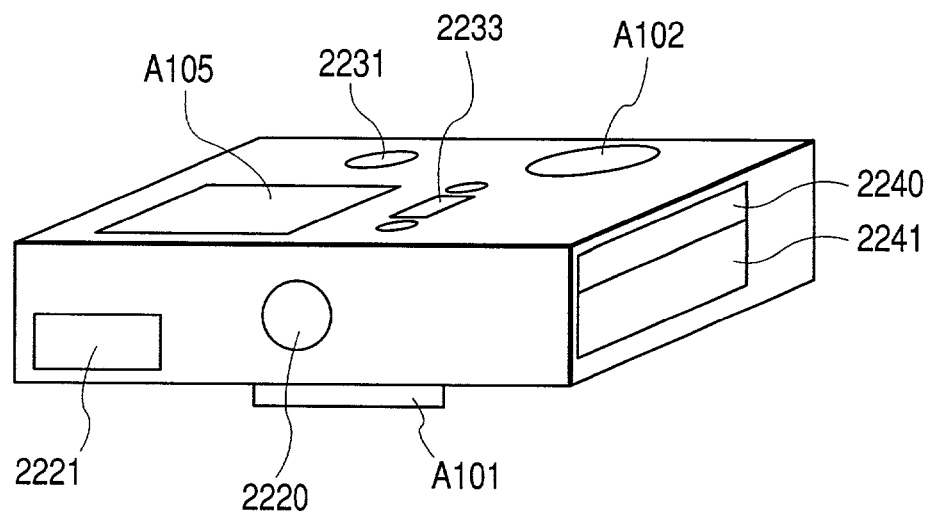
FIG. 20 is a diagram schematically showing the camera with built-in printer shown in FIG. 12, i.e., a perspective diagram in which the camera is viewed from lower left of the back.

FIGS. 19 and 20 are diagrams schematically showing the camera with a built-in printer explained with respect to the above basic structure. Namely, FIG. 19 is the perspective diagram of the camera with a built-in printer which is viewed from upper right of the front, and FIG. 20 is the perspective diagram of the camera with a built-in printer which is viewed from lower left of the back. On the front side of the camera with a built-in printer, a lens A101, an AF (autofocus) fill light generator 1203 and a stroboscopic lamp A103 are disposed to compose the image pickup unit 2103 shown in FIG. 18. Further, the viewfinder 2104 of FIG. 18 is composed of a finder window A102a disposed on the front side and a finder eyepiece unit A102 disposed on the back side.

Further, the operation unit 1107 of FIG. 18 is composed of the release button A104 disposed on the top side, and keys 2231 and 2233 disposed on the back side and used to handle a menu screen displayed on a liquid crystal display unit A105. It should be noted that the liquid crystal display unit A105 corresponds to the LCD 106 shown in FIG. 18.

On one side of the camera with a built-in printer, a CF card slot cover 2240 and a media pack cover 2241 are disposed. Here, the CF card slot cover 2240 covers and caps the insertion port through which the CF card A107 is inserted, and the media pack cover 2241 covers and caps the insertion part by which the media pack C100 is mounted to the printer unit B100. On the other side (i.e., the side opposite to the above one side), a discharge unit A109 through which a printing sheet (or a printing medium) C104 subjected to the printing by said printer unit B100 is discharged.

On the bottom side of the camera with a built-in printer, numeral 2221 denotes a battery cover which covers and caps the insertion port through which a battery acting as the power supply unit 250 is inserted, and numeral 2220 denotes a screw hole to install a tripod.

Figure 21:
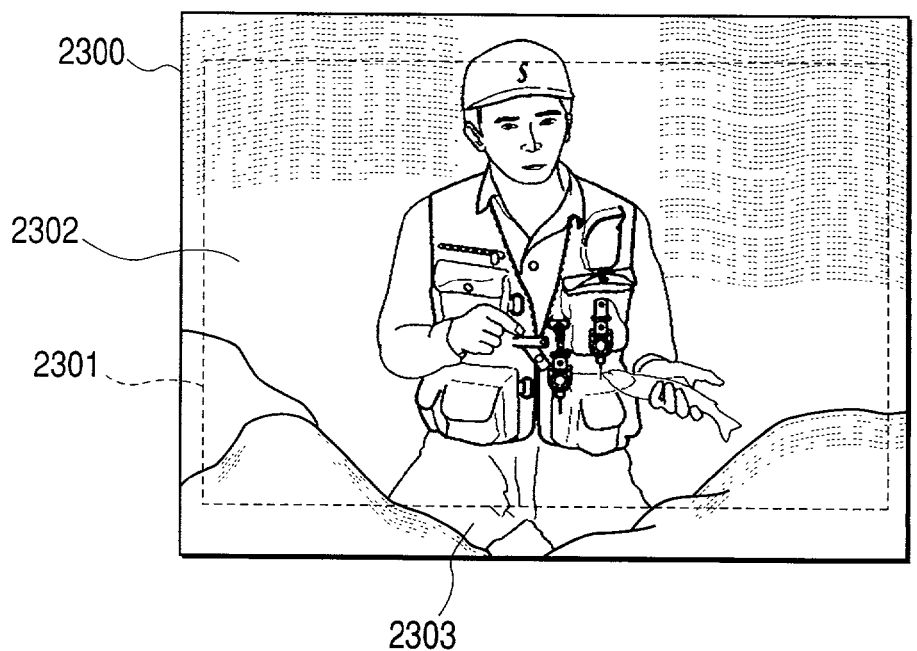
FIG. 21 is a diagram for explaining a display example in which a printable area is indicated on a display.

FIG. 21 is a diagram for explaining a display example of a printable area. In FIG. 21, numeral 2300 denotes an entire display screen of the LCD 106 in FIG. 18 or the liquid crystal display A105 in FIG. 20. Numeral 2301 denotes a border line between the printable area and a nonprintable area. A part 2302 surrounded by the border line 2301 is the printable area which is displayed on the display screen 2300 and in which the image is displayed closely and finely. A part 2303 outside the printable area 2302 is the nonprintable area, and this area 2303 is also included in the taken image part. The image in the nonprintable area 2303 can be viewed by the user, but is not displayed closely and finely as compared with the image in the printable area 2303 because the nonprintable area 2303 is masked in a filter process or the like.

Figure 22:
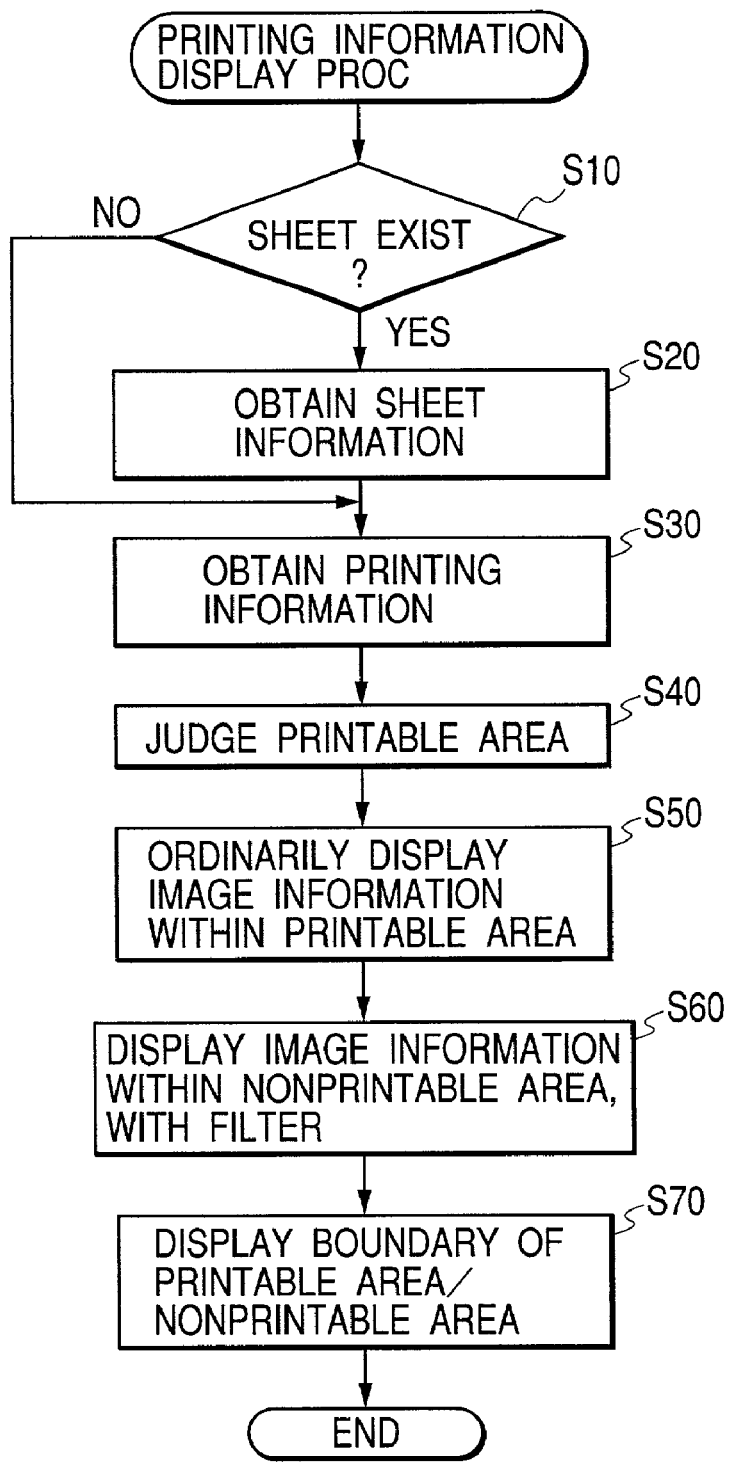
FIG. 22 is a flow chart of a display processing procedure to indicate the printable area and a nonprintable area.

FIG. 22 is a flow chart of a display processing procedure to indicate the printable area and the nonprintable area. For example, the display processing procedure can be started if a user's instruction to indicate the printable area is issued through the operation unit 2107, in a case where the image information taken by the image pickup unit 2103 at the photographing time and stored in the RAM 2102 is displayed on the LCD 106, or in a case where the image information stored in the nonvolatile storage medium, such as the CF card A107 or the like, is expanded into the RAM 102 by the card drive 2110 and the expanded data is displayed on the LCD 106.

If the display processing procedure is started, in a step S10, it is first judged whether or not the media pack C100 has been inserted into the printer unit B100. If judged that the media pack C100 has been inserted into the printer unit B100, it is further judged whether or not sheets exist in the media pack C100. If NO in the step S10, the flow advances to a step S30 to obtain printing information.

Conversely, if YES in the step S10, the flow advances to a step S20. In this step, sheet information such as size, characteristic and the like of the sheet in the media pack C100 is read from the EEPROM 224 in the media pack C100.

In the step S30, the user-designated printing information input from the operation unit 2107 according to an operation menu displayed on the LCD 106 is obtained. It is assumed that, as information for determining a printing range, the printing information may include information for instructing to perform fullbleed printing (i.e., printing not forming any margin at the periphery of the printing sheet C104), information for instructing the performance of printing with a margin, information for instructing the performance of the printing at position and size determined within a template, and the like.

In a step S40, the printable area is determined for the image information displayed on the LCD 106, on the basis of the printing sheet information obtained in the step S20 and the user-designated printing information obtained in the step S30.

In a step S50, the image information in the area judged as the printable area in the step S40 is ordinarily displayed. This corresponds to the area 2302 shown in FIG. 21. Further, in a step S60, the image information in the area judged as the nonprintable area in the step S40 is displayed with a filter, e.g., a monochrome filter. This corresponds to the area 2303 shown in FIG. 21. In a step S70, the border line 2301 is displayed to clarify the border between the printable area and the nonprintable area.

According to the present embodiment, on the camera with a built-in printer, the user can easily confirm the original image information such as the taken image and the actual printing area included in the taken image, whereby a useless operation, such as rephotographing or the like, need not be performed.

In the present embodiment, the display to indicate the printable area is performed on the LCD 106 (the liquid crystal display A105). However, instead of this, or in addition to this, such the display may be performed on the viewfinder 2104.

Further, in the above steps S50 to S70, the printable area, the nonprintable area, and the border line between the printable area and the nonprintable area are displayed. The structure to indicate the printable area with respect to the original image information is not limited to the above. For example, only the border line may be displayed, or the nonprintable area may be subjected to trimming with respect to the original image information and then displayed. In this case, a trimmed background (i.e., the nonprintable area) may be displayed with black.

Further, with respect to the above processing procedure, it is possible to add a process of designating, by referring to the indicated printable area, the area to which the user wishes to perform the printing, a process of shifting the display position of the printable area on the display screen 2300 in accordance with the above designating process, a process of setting the final printing area, and the like. Further, after such a printing area was set, the user can instruct the starting of the printing, whereby the printing can be performed according to the user's instruction. Further, if the media pack C100 is not inserted, or if there is no sheet, a display to urge the user to insert a new media pack is performed. Then, if the new media pack is inserted, it is judged whether or not its sheet information conforms with the set printing area, and thus a necessary process according to the judged result can be performed.

Further, in the present embodiment, the EEPROM is used to obtain the sheet information in the step S20. This is effective in a case where the predetermined information is received from the side of the printer unit B100 and thus the held information is appropriately rewritten, e.g., in a case where the number of the held printing media C104 is reduced according to progress of recording. However, if it is enough for the side of the media pack C100 to present or provide the information on itself, the storage means, such as the EEPROM or the like, whose held contents are rewritable, need not necessarily be used. For example, a part of shape of the media pack C100 may be changed according to the kind of sheet held in the holder, and also a means for recognizing the kind of sheet according to the changed shape may be provided on the side of the printer unit B100. Further, the user may set printing information in accordance with a kind of media pack.

Further, information concerning the printable area may be stored as the information held by the storage means such as the above EEPROM or the like. Thus, even with respect to an identical-sized sheet, the printable area can be changed for each holder. Further, even with respect to a media pack which has been newly manufactured and thus is not yet recognized on the digital camera side, a printable area can be correctly recognized.

Further, it is possible not only to merely display a frame suitable for the printing sheet on the basis of the information stored in the EEPROM of the media pack, but also to provide a judgment means (not shown) for judging, according to a photographing mode and a printing mode, whether or not these modes conform with the sheet and ink in the media pack and further provide an alarm means (not shown) for providing an alarm if these modes do not conform with the sheet and ink in the media pack. For example, it is supposed that the ink and sheet in the media pack are for a monochrome image. Then, in a case where photographing is performed in a color photographing mode to be able to obtain a color image represented with plural colors, or in a case where it is intended to perform printing in a color printing mode using plural-color inks, it is displayed that the used mode does not completely conform with the ink or sheet in the media pack. By doing so, since the user can easily see such inconformity between the operation and the apparatus, he can change the media pack, the photographing mode, the printing mode and the like. Further, it is possible to provide a mode change means (not shown) which displays an alarm on the LCD or the like, and causes the apparatus to automatically change the photographing mode and/or the printing mode. Of course, instead of such the alarm display, it is possible to generate an alarm sound from a speaker.

Thus, if the printer has the plural printing modes, and if the digital camera has the plural photographing modes and selectively changes these modes, it is effective to appropriately change the alarm display, the photographing mode and the printing mode on the basis of one of or both of the kind of ink and the kind of sheet in the media pack.

In the above explanation, the ink was used as the coloring agent in the media pack. However, since the kind of coloring agent is arbitrary, a coloring agent such as an ink ribbon, color toner or the like may be used. However, if an inkjet-type printer is used, it is very effective to obtain the information of ink and/or sheet so as to control and adjust the given calorific value, the ink emission quantity, the tint according to a sheet, and the like.

Although the case where the present invention is applied to the camera with a built-in printer or the digital camera-cum-printer were explained in the above embodiments, the present invention is also applicable to a digital camera which can be connected to a printer or a host apparatus such as a personal computer of holding printing information and thus obtain the printing information.

Further, by supplying a program of executing the above processing procedure to the camera with a built-in printer, the digital camera, or the host apparatus such as the personal computer, it becomes possible for the user to easily recognize the photographing image information and the printing image information.

Namely, the programs of executing the processes in the above embodiments may not be necessarily preinstalled in the apparatus but may be directly or indirectly supplied from the host computer side or the like of supplying the image data to the printer. For example, the scope of the present invention includes a case where program codes of software for achieving the functions of the above embodiments are supplied to the host computer and thus the functions of the above embodiments are actually achieved by the setting of this host computer.

In this case, the program codes themselves achieve the new functions of the present invention, whereby the program codes themselves and a means for supplying the program codes to the computer through communication, a storage medium or the like is included in the scope of the present invention.

As the storage medium used to supply the program codes, e.g., a floppy disk, a CD-ROM, a hard disk, an optical disk, a magnetooptical disk, a CD-R, a magnetic tape, a nonvolatile memory card, a ROM, or the like can be used.

As described above, in the camera-cum-printer, or in the digital camera which is connected to the printer, the personal computer or the like holding the printing information and thus can obtain the printing information, it is possible for the user to easily confirm the original image information and the printable area in the original image information.

Particularly, if the printable area can be displayed at the photographing time, the user can easily confirm a finish after the printing. Thus, the user can perform the photographing such that the part necessary for the printing is surely put inside the printable area.

Further, in a case where the user carries the camera and the printer together and thus prints the image at the place where the user took this image, or in a case where there is no image editing apparatus such as a personal computer or the like nearby the user himself, it is very effective for the user to see and confirm the printable area of the image at the place where and at the time when this image is taken and reproduced by the digital camera.

Further, even if the printing area is nonfavorable for the user, he can change the media pack to the desired one by simple operation and thus perform the printing in the favorable printable area.

Although the present invention has been described with reference to the above embodiments, the present invention is not limited to them but encompasses any and all modifications or combinations within the spirit and scope of the appended claims.

What is claimed is:

1. A printer comprising:
   a mounting unit adapted to detachably mount a media holder holding therein inks and papers;
   an acquisition unit adapted to acquire media information concerning the held inks and the held papers from the media holder mounted by said mounting unit;
   a memory adapted to store a parameter for image processing;
   an image processing unit adapted to execute an image process to image data by using a parameter for image processing; and
   a determination unit adapted to analyze the media information acquired by said acquisition unit, and, according to the analyzed result, determine the parameter for image processing to be used by said image processing unit,
   wherein the parameter for image processing to be used by said image processing unit can be described in the media information,
   wherein the determination unit comprises a switching unit switching between using a media-holder-acquired, image-processing parameter to process the image data and a memory-acquired, image-processing parameter to process the image data, depending on whether the parameter is described in the media information acquired from the media holder so that:
      in a case where the parameter for image processing has been described in the media information acquired from the media holder, said determination unit determines the parameter described in the media information acquired by said acquisition unit as the parameter for image processing to be used by said image processing unit, and
      in a case where a parameter for image processing is not described in the media information acquired from the media holder, said determination unit determines the parameter acquired from the memory of the printer as the parameter for image processing to be used by said image processing unit.

2. A printer according to claim 1, wherein the parameter for image processing includes at least one of a constant for gamma conversion, a parameter for color conversion, and a parameter for halftoning process.

3. A printer according to claim 1, wherein the memory stores a table on which correspondence between the media type and the parameter is described, wherein, in the case where the parameter is not described in the media information, said determination unit acquires, by referring the table stored in said memory, a parameter corresponding to information of a media type included in the media information acquired from the media holder and determines the acquired parameter as a parameter for image processing to be used by said image processing unit.

4. A printer according to claim 1, wherein, in a case where invalid information is included in the media information, said determination unit determines a default parameter stored in the memory as the parameter for image processing to be used by said image processing unit.

5. A printer according to claim 1, wherein said acquisition unit acquires the media information from a memory provided in the mounted media holder.

6. A printing method for a printer comprising the steps of:
   providing a mounting unit adapted to detachably mount a media holder holding therein inks and papers;
   acquiring media information concerning the held inks and the held papers from the media holder mounted by said mounting unit;
   providing a memory for the printer configured to store a parameter for image processing;
   executing an image process to image data by using a parameter for image processing; and
   analyzing the acquired media information, and, according to an analyzed result, determining the parameter for image processing to be used in executing the image process,
   wherein the parameter for image processing to be used by said executing step can be described in the media information,
   wherein the analyzing step comprises a switching step of switching between using a media-holder-acquired, image-processing parameter to process the image data and a memory-acquired, image-processing parameter to process the image data, depending on whether the parameter is described in the media information acquired from the media holder so that:
      in a case where the parameter for image processing has been described in the media information acquired from the media holder, said analyzing step determines the parameter described in the media information acquired by said acquiring step as the parameter for image processing to be used by said executing step, and
      in a case where a parameter for image processing is not described in the media information acquired from the media holder, a parameter acquired from the memory is used as the parameter for executing the image process.

7. A printing method according to claim 6, wherein the parameter for executing the image process includes at least one of a constant for gamma conversion, a parameter for color conversion, and a parameter for halftoning process.

8. A printing method according to claim 6, wherein the step of providing the memory provides a memory adapted to store a table on which correspondence between the media information and the parameter is described, wherein, in the case where the parameter is not described in the media information, the printer acquires, by referring the table stored in the memory, a parameter corresponding to information of a media type included in the media information acquired from the media holder and determines the acquired parameter as a parameter for image processing to be used by said executing step.

9. A printing method according to claim 6, wherein, in a case where invalid information is included in the media information, a default parameter stored in the memory of the printer is used as the parameter for executing the image process.

10. A printing method according to claim 6, wherein the media information is acquired from a memory provided in the mounted media holder.

* * * * *